(12) United States Patent
Narayanaswamy et al.

(10) Patent No.: US 10,563,130 B2
(45) Date of Patent: Feb. 18, 2020

(54) UPGRADING HYDROGEN DEFICIENT STREAMS USING HYDROGEN DONOR STREAMS IN A HYDROPYROLYSIS PROCESS

(71) Applicant: SABIC Global Technologies B.V., Bergen op Zoom (NL)

(72) Inventors: Ravichander Narayanaswamy, Thuwal (SA); Krishna Kumar Ramamurthy, Thuwal (SA); Sreenivasan Perinkulam Subramanian, Thuwal (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 57 days.

(21) Appl. No.: 15/315,438

(22) PCT Filed: Jul. 13, 2015

(86) PCT No.: PCT/IB2015/055295
§ 371 (c)(1),
(2) Date: Dec. 1, 2016

(87) PCT Pub. No.: WO2016/009333
PCT Pub. Date: Jan. 21, 2016

(65) Prior Publication Data
US 2018/0216009 A1    Aug. 2, 2018

Related U.S. Application Data

(60) Provisional application No. 62/025,762, filed on Jul. 17, 2014.

(51) Int. Cl.
*C10G 1/10*    (2006.01)
*C10G 1/06*    (2006.01)
(Continued)

(52) U.S. Cl.
CPC ............... *C10G 1/10* (2013.01); *C10G 1/002* (2013.01); *C10G 1/06* (2013.01); *C10G 1/08* (2013.01);
(Continued)

(58) Field of Classification Search
CPC ... C10G 1/10; C10G 1/00; C10G 1/06; C10G 1/08
See application file for complete search history.

(56) References Cited

U.S. PATENT DOCUMENTS

| 4,297,204 A | 10/1981 | Schliebener et al. | 208/95 |
| 4,818,368 A | 4/1989 | Kalnes et al. | 208/50 |

(Continued)

FOREIGN PATENT DOCUMENTS

| AU | 198432205 | 8/1984 |
| AU | 2010235215 | 10/2010 |

(Continued)

OTHER PUBLICATIONS

Zhang et al. (Catalytic Co-pyrolysis of Biomass and Different Plastics (Polyethylene, Polypropylene, and Polystyrene) to Improve Hydrocarbon Yield in a Fluidized-Bed Reactor, Energy & Fuels, Jan. 29, 2014, vol. 28, pp. 1940-1947. (Year: 2014).*

(Continued)

*Primary Examiner* — Youngsul Jeong
(74) *Attorney, Agent, or Firm* — Norton Rose Fulbright US LLP

(57) ABSTRACT

Disclosed is a method for producing olefins and aromatic compounds from a hydrogen lean carbon containing feed, the method comprising hydropyrolyzing the hydrogen lean carbon containing feed in the presence of a hydrogen donor feed under reaction conditions sufficient to produce a product comprising olefins and aromatic compounds or a hydrocarbonaceous stream, wherein the hydrocarbonaceous
(Continued)

stream is further processed into olefins and aromatic compounds, wherein the olefins and aromatic compounds from (i) or the hydrocarbonaceous stream from (ii) are each obtained by hydrogenation of the hydrogen lean carbon containing feed with the hydrogen donor feed and cracking of carbonaceous compounds comprised in the hydrogenated feed, and wherein the hydrogen donor feed comprises a compound that donates hydrogen to carbonaceous compounds in the hydrogen lean feed.

10 Claims, 13 Drawing Sheets

(51) Int. Cl.
  *C10G 1/00* (2006.01)
  *C10G 1/08* (2006.01)
(52) U.S. Cl.
  CPC ..... *C10G 2400/20* (2013.01); *C10G 2400/22* (2013.01); *C10G 2400/30* (2013.01)

(56) References Cited

U.S. PATENT DOCUMENTS

| | | | | |
|---|---|---|---|---|
| 4,927,522 | A * | 5/1990 | Herbst | C10G 11/18 208/114 |
| 4,927,552 | A | 5/1990 | Herbst et al. | 208/120 |
| 5,079,385 | A | 1/1992 | Wu | 585/241 |
| 5,359,099 | A * | 10/1994 | Evans | C10G 1/02 549/429 |
| 5,384,037 | A | 1/1995 | Kalnes | 208/85 |
| 5,386,055 | A | 1/1995 | Lee et al. | 562/512.2 |
| 5,702,589 | A * | 12/1997 | Tsang | C10G 11/18 208/147 |
| 5,961,786 | A | 10/1999 | Freel et al. | 202/121 |
| 6,184,427 | B1 | 2/2001 | Klepfer et al. | 585/241 |
| 6,184,430 | B1 | 2/2001 | Venkatesh et al. | 585/750 |
| 6,270,655 | B1 | 8/2001 | Ganguli | 208/85 |
| 7,968,757 | B2 | 6/2011 | Abhari et al. | 585/240 |
| 7,972,498 | B2 | 7/2011 | Buchanan et al. | 208/61 |
| 8,063,258 | B2 | 11/2011 | Bartek et al. | 585/240 |
| 8,105,397 | B2 | 1/2012 | Fieni et al. | 44/300 |
| 8,217,210 | B2 | 7/2012 | Agrawal et al. | 585/240 |
| 8,217,211 | B2 | 7/2012 | Agrawal et al. | 585/240 |
| 8,367,882 | B2 | 2/2013 | Cortright et al. | 585/240 |
| 8,492,600 | B2 * | 7/2013 | Marker | C01B 3/16 585/240 |
| 2003/0115792 | A1 | 6/2003 | Shabtai et al. | 44/605 |
| 2007/0170091 | A1 | 7/2007 | Monnier et al. | 208/15 |
| 2007/0173673 | A1 | 7/2007 | Fujimoto et al. | 585/241 |
| 2009/0057193 | A1 | 3/2009 | Farshid et al. | 208/56 |
| 2009/0084666 | A1 | 4/2009 | Agrawal et al. | 201/2.5 |
| 2009/0288985 | A1 | 11/2009 | Long et al. | 208/57 |
| 2011/0087059 | A1 | 4/2011 | Simon et al. | 585/240 |
| 2011/0201855 | A1 | 8/2011 | Marinangeli et al. | 585/240 |
| 2011/0245545 | A1 | 10/2011 | Levin | 568/840 |
| 2012/0053379 | A1 | 3/2012 | Harlin et al. | 585/330 |
| 2012/0157726 | A1 | 6/2012 | Vauk et al. | 585/240 |
| 2012/0165583 | A1 | 6/2012 | Garforth et al. | 585/241 |
| 2012/0215043 | A1 | 8/2012 | Gaffney | 585/241 |
| 2012/0260563 | A1 | 10/2012 | Marker et al. | 44/307 |
| 2013/0000182 | A1 | 1/2013 | O'Connor et al. | 44/307 |
| 2013/0067801 | A1 | 3/2013 | Nousiainen et al. | 44/306 |
| 2013/0146508 | A1 | 6/2013 | Quignard et al. | 208/413 |

FOREIGN PATENT DOCUMENTS

| | | |
|---|---|---|
| CA | 1294236 | 1/1992 |
| CA | 1335587 | 5/1995 |
| CA | 2146119 | 1/2005 |
| CA | 2759954 | 11/2010 |
| CA | 2664241 | 2/2013 |
| CN | 1181409 | 5/1998 |
| CN | 1255407 | 6/2000 |
| CN | 1354225 | 6/2002 |
| CN | 1362491 | 8/2002 |
| CN | 1458245 | 11/2003 |
| CN | 1594508 | 3/2005 |
| CN | 1594509 | 3/2005 |
| CN | 1597857 | 3/2005 |
| CN | 1597861 | 3/2005 |
| CN | 1597862 | 3/2005 |
| CN | 1611578 | 5/2005 |
| CN | 1644653 | 7/2005 |
| CN | 1766048 | 5/2006 |
| CN | 101314724 | 12/2008 |
| CN | 101338213 | 1/2009 |
| CN | 101343557 | 1/2009 |
| CN | 101353583 | 1/2009 |
| CN | 101374930 | 2/2009 |
| CN | 101402874 | 4/2009 |
| CN | 101433848 | 5/2009 |
| CN | 101646749 | 2/2010 |
| CN | 102068992 | 5/2011 |
| CN | 102666796 | 9/2012 |
| CN | 103146411 | 6/2013 |
| DE | 2530229 | 1/1977 |
| DE | 4412941 | 10/1995 |
| EP | 0182309 | 7/1989 |
| EP | 0367021 | 5/1990 |
| EP | 0310164 | 5/1991 |
| EP | 0310165 | 5/1991 |
| EP | 0909804 | 4/1999 |
| EP | 1285903 | 2/2003 |
| EP | 2325281 | 5/2011 |
| FR | 2951191 | 4/2011 |
| JP | 2005154510 | 6/2005 |
| JP | 2006199853 | 8/2006 |
| JP | 2007138576 | 6/2007 |
| JP | 2007302766 | 11/2007 |
| JP | 4154929 | 9/2008 |
| JP | 4520095 | 8/2010 |
| JP | 4943816 | 5/2012 |
| JP | 4966474 | 7/2012 |
| KR | 2012101010 | 9/2012 |
| WO | WO 9608544 A1 | 3/1996 |
| WO | WO 2003053894 | 7/2003 |
| WO | WO 2004043582 | 5/2004 |
| WO | WO 2005061673 | 7/2005 |
| WO | WO 2008141655 | 11/2008 |
| WO | WO 2008157163 | 12/2008 |
| WO | WO 2009151692 | 12/2009 |
| WO | WO 2010049821 | 5/2010 |
| WO | WO 2010117436 | 10/2010 |
| WO | WO 2011025632 | 3/2011 |
| WO | WO 2011031320 | 3/2011 |
| WO | WO 2011044549 | 4/2011 |
| WO | WO 2011060556 | 5/2011 |
| WO | WO 2011159334 | 12/2011 |
| WO | WO 2012035410 | 3/2012 |
| WO | WO 2012049416 | 4/2012 |
| WO | WO 2012062924 | 5/2012 |
| WO | WO 2012076890 | 6/2012 |
| WO | WO 2012121974 | 9/2012 |
| WO | WO 2012145123 | 10/2012 |
| WO | WO 2013015895 | 1/2013 |
| WO | WO 2013169462 | 11/2013 |
| WO | WO 2014023758 | 2/2014 |
| WO | WO 2014125345 | 8/2014 |
| WO | WO 2015047085 | 4/2015 |

OTHER PUBLICATIONS

Kuznetsov et al. (The study of different methods of bio-liquids production from wood biomass and from biomass/polyolefine mixtures, 2009, International Journal of hydrogen energy, vol. 34, pp. 7051-7056) (Year: 2009).*

Office action issued in Chinese Application No. 201580032556.1 dated Feb. 5, 2018.

International Preliminary Report on Patentability for PCT/IB2015/055295, dated Oct. 26, 2016.

(56) References Cited

OTHER PUBLICATIONS

International Search Report and Written Opinion for PCT/IB2015/055295, dated Dec. 21, 2015.
Li et al., *Applied Catalysts A: General* 455 (2013): 114-121.
Meng et al., *Energy Fuels* 23.1 (2009): 65-69.
Thangalazhy-Gopakumar et al., *Energy Fuels* 26.8 (2012): 5300-5306.
Zhang et al., *Energy Fuels* 28 (2014): 1940-1947.

* cited by examiner

UPGRADING HYDROGEN DEFICIENT STREAMS USING HYDROGEN DONOR STREAMS IN A HYDROPYROLYSIS PROCESS

CROSS REFERENCE TO RELATED APPLICATIONS

This application is a national phase application under 35 U.S.C. § 371 of International Application No. PCT/IB2015/055295 filed Jul. 13, 2015, which claims benefit to U.S. Provisional Patent Application No. 62/025,762 titled "UPGRADING HYDROGEN DEFICIENT STREAMS USING HYDROGEN DONOR STREAMS IN A HYDROPYROLYSIS PROCESS", filed Jul. 17, 2014. The entire contents of each of the above-referenced applications are incorporated herein by reference without disclaimer.

BACKGROUND OF THE INVENTION

A. Field of the Invention

The invention generally concerns hydropyrolysis of hydrocarbonaceous streams to produce high quality hydrogen rich products and/or product streams, namely products that include olefins and aromatic compounds.

B. Description of Related Art

The identification of new sources of chemical starting materials and methods for their conversion into useable hydrocarbonaceous compounds is driven by many concerns including environmental, health, safety issues, and the inevitable future scarcity of petroleum-based compounds.

Biomass material is the most commonly processed carbonaceous waste feed stock used to produce renewable fuels or chemicals. Waste plastic, rubber, manure, crop residues, forestry, tree and grass cuttings and bio solids from waste water (sewage) treatment are also candidate feed stocks for conversion processes. Biomass feed stocks can be converted to produce electricity, heat, valuable chemicals or fuels.

A number of processes exist to convert biomass to fuels and/or chemicals. One of these processes is to subject biomass to thermal chemical processing in the absence of air. The resulting pyrolysis oil, however, degrades over time and is generally considered unstable.

Subjecting biomass to catalytic thermal processing is known in the art. Many of these attempts require an external source of molecular hydrogen ($H_2$). Many of these attempts also require the use of multiple catalysts and/or further processing to produce products that are acceptable for use as fuel and/or chemical products. Such attempts typically involve the chemical conversion of the biomass into char and/or a particulated biomass. The particulated biomass may be mixed with an organic liquid solvent to form a suspension. The suspension can be heated in the presence of hydrogen and a catalyst to convert the biomass to a bio-oil and/or fuel (see, U.S. Pat. No. 8,063,258 to Bartek et al.). Other attempts to provide fuel include using rapid pyrolysis under temperatures ranging from about 400-600° C. in the presence of hydrogen gas to produce a liquid hydrocarbon mixture (see, U.S. Pat. No. 8,217,210 to Agrawal et al.).

Problems associated with the current methods of producing fuel and/or chemical products from biomass are at least two-fold. First, several of the methods require an external source of molecular hydrogen. Molecular hydrogen is expensive as it typically must be generated. Second, many single stage or multi-stage reactions produce unwanted by-products and/or coke due to the varying nature of the starting material and the harsh reaction conditions. Although there have been many attempts to produce commercially relevant chemical products from biomass, they suffer from inefficiencies caused by these problems.

SUMMARY OF THE INVENTION

A solution to the current problems associated with producing commercially relevant chemicals from biomass and other hydrogen lean containing materials has been discovered. In particular, the solution resides in hydropyrolyzing a hydrogen lean carbon containing feed in the presence of a hydrogen donor feed. It was discovered that this reaction can convert the hydrogen lean carbon containing feed to hydrocarbon mixtures having economic value. It has also been discovered that a hydrogen rich carbon containing feed can be hydropyrolyzed to directly produce hydrocarbon mixtures having economic value. These discoveries provide several solutions to the problems existing with the current state of the art in this field. For one, instead of relying on molecular hydrogen, a hydrogen donor feed having hydrocarbons can be used as a source of atomic hydrogen (H). Second, directly hydropyrolyzing a hydrogen rich carbon containing feed generates a source of atomic hydrogen and/or $H_2$, and thus eliminating the need for an external source of $H_2$. If a catalyst is present, a sufficient amount of hydrogen gas can be added to maintain a hydrogen atmosphere to minimize coking and activate the catalyst. The additional amount of hydrogen gas can be provided from recycled hydrogen generated from the hydropyrolysis process. Therefore, the methods of the present invention have the benefit of lessening the demand for costly molecular hydrogen. Third, the processes produce economically valuable chemical compounds, examples of which include light olefins, aromatic compounds, and hydrocarbonaceous streams that can be further processed into olefins and aromatic compounds. Fourth, the discoveries of the present invention provide for processes that are self-sufficient on energy balance. Another discovery in the context of the present invention is the use of sand with traditional catalysts to enhance hydropyrolysis of hydrogen lean carbon containing feeds and hydrogen rich carbon containing feeds. These sand/catalysts combinations can also enhance the production of ethylene under certain reaction conditions.

In one embodiment of the present invention, there is a method for producing olefins and aromatic compounds from a hydrogen lean carbon containing feed, the method comprising hydropyrolyzing the hydrogen lean carbon containing feed in the presence of a hydrogen donor feed under reaction conditions sufficient to produce a product. The product can include olefins or aromatic compounds or a combination of both. In certain instances, the majority of the product can include olefins or aromatics or both. By majority it is meant that at least 50 wt. % of the product includes olefins or aromatics or the combination of olefins and aromatics is at least 50 wt. %. In some instances, the product stream can include olefins, aromatics, and other hydrocarbons, for example paraffins, iso-paraffins, naphthenes, or heavy hydrocarbons. Alternatively, the product can include a hydrocarbonaceous stream that includes compounds that are reduced in molecular weight as compared to the starting hydrogen lean carbon containing feed. The hydrocarbonaceous stream can then be further processed into olefins or aromatic compounds, or mixtures thereof. In certain instances, the majority of the product can be the hydrocarbonaceous stream. Still further, the product can include a combination of olefins, aromatics and a hydrocarbonaceous stream. That is to say, the hydrocarbonaceous stream can include olefins and aromatics. In either instance, the olefins and aromatic compounds or the hydrocarbonaceous stream can each be obtained by hydrogenation of the hydrogen lean carbon containing feed with the hydrogen donor feed and cracking of carbonaceous compounds comprised in the hydrogenated feed. The hydrogen donor feed in the context of the present invention includes at least one compound that donates hydrogen to carbonaceous compounds in the hydrogen lean feed and the donating compound is not hydrogen ($H_2$). Non-limiting examples of compounds that can donate hydrogen to carbonaceous compounds in the hydrogen lean feed include $C_1$ to $C_4$ gases (e.g., methane, ethane, propane, butane), naphtha or diesel liquids, Fischer-Tropsch liquids, virgin or waste polymers, wax or grease, hydrogen donor solvents, plastics, waste ammonia or urea or any combination thereof. In particular instances, the compound that donates a hydrogen can be a polymer, non-limiting examples of which include polymers of polyolefin, polyethylene, polypropylenes, polystyrenes, polyethylene terephthalate (PET), polyvinyl chloride (PVC), polyamide, polycarbonate, polyurethane, polyester, or any combination thereof. In some aspects of the present invention, the hydrogen donor feed can be supplemented with hydrogen gas ($H_2$) that is recycled from the process or that is not recycled from the process. However, hydrogen gas is not needed in the context of the present invention, as the hydrogen donor stream includes a compound that donates hydrogen. The process of the present invention can also include reforming any of the carbon compounds from the un-cracked or cracked hydrogenated feed to form aromatic compounds. In one aspect of the present invention, the process can be performed under reaction conditions that include a temperature of about 400 to about 700° C. or at a pressure of atmospheric pressure to about 17.5 MPa or both. The hydrogen lean carbon containing feed can include biomass, tires, sewage sludge, municipal solid waste, paper, coal, oil sands, oil shale, heavy petroleum oils, or bio oil, or combinations thereof. In particular instances, the hydrogen lean carbon containing feed includes biomass, non-limiting examples of which include plant material, tree material, aquatic material, or a mixture thereof. In one preferred embodiment, the hydrogen lean carbon containing feed comprises biomass and the compound in the hydrogen donor feed that donates hydrogen to the carbonaceous compounds in the hydrogen lean feed is a polymer. The hydrogen lean carbon containing feed of the present invention has a hydrogen content of 12 wt. % or less, and preferably between 9 wt. % to 12 wt. % of hydrogen. However, less than 9 wt. % hydrogen is also contemplated (e.g., 8, 7, 6, 5, 4, 3, 2, 1, or less wt. % of hydrogen contained in the hydrogen lean carbon containing feed). The combination of the hydrogen lean carbon containing feed and the hydrogen donor feed comprises greater than 12 wt. % of hydrogen. In some instances, the process of producing the olefins and aromatic compounds or the hydrocarbonaceous stream that can be subsequently converted to olefins and aromatics can be performed in a single reactor. In other instances, two reactors (e.g., in series with one another) can be used. In still other instances, three, four, five, or more reactors can be used. Non-limiting examples of reactors that can be used include fixed-bed reactors, fluidized bed reactors, bubbling bed reactors, slurry reactors, rotating kiln reactors, or any combinations thereof when two or more reactors are used. Each reactor can have one stage where the reaction occurs or two or more stages, where separate reactions occur in the different stage of the reactor. Each stage can have a catalyst to help catalyze a given reaction. Still further, each reactor can have multiple inlets and multiple outlets, which allows for hydrogen lean carbon streams to be placed upstream or downstream or simultaneously with the hydrogen donor streams. In some aspects, a catalyst is not used to produce the olefins and aromatic compounds or the hydrocarbonaceous stream. In other instances, however, the reaction is performed in the presence of a catalyst or a mixture of catalysts. Still further, the hydrocarbonaceous stream can be further subjected to one or more catalysts or to steam cracking to produce olefins or aromatic compounds or both. In some instances, other hydrocarbons are also produced, for example paraffins, iso-paraffins, or naphthenes. The catalyst can be capable of hydrogenating the hydrogen lean carbon containing feed with the hydrogen donor feed and cracking carbonaceous compounds in the hydrogenated feed. The catalyst can be further capable of reforming carbonaceous compounds into aromatics. The catalyst can be a fluidized catalytic cracking (FCC) catalyst, a zeolite catalyst, a hydrodeoxygenation (HDO) catalyst, hydrocracking catalyst, an aromatization catalyst, or any combination thereof. Non-limiting examples of an FCC catalyst include X-type zeolites, Y-type or USY-type zeolites, mordenite, faujasite, nano-crystalline zeolites, MCM mesoporous materials, SBA-15, a silico-alumino phosphate, a gallophosphate, a titanophosphate, or any combination thereof as is, or present in an active or inactive matrix. Non-limiting examples of zeolite catalysts include ZSM-5, ZSM-11, ferrierite, heulandite, zeolite A, erionite, and chabazite, or any combination thereof as is, or present in an active or inactive matrix. Non-limiting examples of HDO catalysts include mono, bi or multi-metals on in-active or active support (e.g., silica, alumina, carbon, titania, zirconia used as supports with metals used could be Co—Mo, Ni—Mo, Fe—Mo, Pt—Mo, Pd—Mo, Pt—Ni or other metals having reducing functionality. These catalysts can also be used in combination with ZSM-5 for further deoxygenation or with metal loaded ZSM-5). Non-limiting examples of hydrocracking catalysts include metal oxide on a support with the metal sulfide being the active catalyst form. Again, the support could be silica, alumina, carbon, titania, zirconia. The catalyst could also be metal load zeolites embedded in a matrix or unsupported metal sulfides. The aromatization catalyst can have a cracking functionality in addition to dehydrogenation functionality (e.g., noble metals or bi-metallic on Alumina or FCC catalyst or zeolites or other suitable support or a combination of these can be used). Sand can also be used or mixed with these catalysts. "Sand" refers to quartz sand, pure silica sand, or such sand with metal or metal oxide contaminants in it. In some aspects of the invention, the sand contains 99% or more of pure silica sand. Sand can be mixed up to 99 wt. % in a catalyst mixture. In preferred aspects, the sand is mixed with the catalyst in an amount of up to 25 wt. % of sand based on the total weight of the sand and catalyst combination. The amount of sand can range from 0.1 wt. % to 25 wt. %, or any amount or range therein (e.g., 1, 2, 3, 4, 5, 6, 7, 8, 9, 10, 11, 12, 13, 14, 15, 16, 17, 18, 19, 20, 21, 22, 23, or 24 wt. % of sand). The catalyst can also be loaded with metal. In preferred aspects, the amount of metal loaded onto the catalyst can be up to 1, 2, 3, 4, 5, 6, 7, or 8 wt. % metal or any amount or range therein. If desired, amounts over 8 wt. % can be used. The loaded metal can be a noble metal or a transition metal or a metal oxide, or combinations thereof. In some particular aspects, the catalyst can include a mixture of metal loaded FCC and metal loaded ZSM-5 or a mixture of metal loaded FCC, metal loaded ZSM-5, and sand. The catalyst can be an unsupported catalyst or a supported catalyst. The catalyst can be integrated particles or in particulate form. The hydrogen lean carbon containing feed or the hydrogen donor feed, or both, can each be fed into the reaction at a catalyst-to-feed ratio of 0.001 to 20 based on the combined feed. In certain aspects, any one of, any combination of, or all of the following reactions can occur: (a) removal of side chains present on mono-aromatic compounds present in the un-cracked or cracked hydrogenated feed; (b) aromatization of paraffins, olefins, or naphthenes present in the un-cracked or cracked hydrogenated feed; (c) hydrogenation of coke or minimization of coke formation; (d) isomerization of compounds present in the un-cracked or cracked hydrogenated feed; and/or (e) hydrodeoxygenation of compounds present in the un-cracked or cracked hydrogenated feed to aromatics. In certain aspects, hydrogen gas can be produced during the reaction, which can then be recycled and combined with the hydrogen donor feed. The processes of the present invention can be continuous processes. In some instances, at least two different hydrogen lean carbon containing feeds can be used, wherein the first hydrogen lean carbon containing feed includes a hydrogen content wt. % that is less than the second hydrogen lean carbon containing feed, and wherein the first hydrogen lean carbon containing feed is introduced upstream from the second hydrogen lean carbon containing feed. Therefore, the first hydrogen lean carbon containing feed, which has less hydrogen content than the second hydrogen lean carbon containing feed, has more contact time than the second feed with the hydrogen donor source. The hydrogen donor feed is introduced at or upstream of the first hydrogen lean carbon containing feed.

In yet another embodiment of the present invention there is disclosed a method for producing olefins and aromatic compounds from a hydrogen rich carbon containing feed. The method can include hydropyrolyzing the hydrogen rich carbon containing feed under reaction conditions sufficient to produce a product. The product can include olefins or aromatic compounds or a combination of both. In certain instances, the majority of the product can include olefins or aromatics or both. Alternatively, the product can include a hydrocarbonaceous stream that includes compounds that are reduced in molecular weight as compared to the starting hydrogen rich carbon containing feed. The hydrocarbonaceous stream can then be further processed into olefins or aromatic compounds, or mixtures thereof. In certain instances, the majority of the product can be the hydrocarbonaceous stream. Still further, the product can include a combination of olefins, aromatics, and a hydrocarbonaceous stream. That is to say, the hydrocarbonaceous stream can include olefins and aromatics. In either instance, the olefins and aromatic compounds or the hydrocarbonaceous stream can each be obtained in a single stage by cracking of carbonaceous compounds in the hydrogen rich carbon containing feed. The hydrogen rich carbon containing feed can include a polymer or a plastic material. The polymer can be a virgin polymer, a waste polymer, or a combination thereof. Non-limiting examples of polymers include polyolefin, polyethylene, polypropylene, polystyrene, polyethylene terephthalate (PET), polyvinyl chloride (PVC), polyamide, polycarbonate, polyurethane, polyester, or any combination thereof. The hydrogen rich carbon containing feed in the context of the present invention includes greater than 12 wt. % of atomic hydrogen. In certain instances where a hydrocarbonaceous stream is produced, carbon compounds in this stream can be reformed to aromatics. This reaction can be performed in one reactor and in one stage in one reactor. However, multiple stages and multiple reactors are also contemplated. The reaction conditions, types of catalysts used, types of reactors used, and types of reactions that occur in the reactor can be the same as those described directly above and throughout the specification. In some aspects of the invention, a carrier gas can be used in combination with the hydrogen rich carbon containing feed. The carrier gas can include inert gases such as nitrogen gas, helium gas or argon gas. In a particular aspect of the invention, the carrier gas can include 5% to 15%, by volume, of hydrogen gas and the 95% to 85%, by volume, of nitrogen gas, helium gas, or argon gas, or any combination thereof, preferably, the carrier gas includes 5% to 15%, by volume of hydrogen gas and 95% to 85%, by volume, of nitrogen gas.

In still another embodiment of the present invention there is disclosed a catalyst capable of producing (i) olefins and aromatic compounds or (ii) a hydrocarbonaceous stream that can be further processed to olefins and aromatic compounds from a hydrogen lean carbon containing feed or a hydrogen rich carbon containing feed. The catalyst can be a mixture of sand and a traditional catalyst used to produce olefins and aromatics. The catalyst can be an unsupported catalyst or a supported catalyst. The amount of the sand mixed with the catalyst can be 0.1 wt. % to 25 wt. % or any amount or range therein (e.g., 1, 2, 3, 4, 5, 6, 7, 8, 9, 10, 11, 12, 13, 14, 15, 16, 17, 18, 19, 20, 21, 22, 23, or 24 wt. % of sand). In particular, instances, the sand can be mixed with a fluidized catalytic cracking (FCC) catalyst, a spent FCC catalyst, a zeolite catalyst, a hydrodeoxygenation (HDO) catalyst, a hydrocracking catalyst, an aromatization catalyst, or any combination thereof. As explained above "sand" refers to quartz sand, pure silica sand, or such sand with metal or metal oxide contaminants in it. The various catalysts, metals, and supports discussed directly above and throughout this specification can be mixed with the sand. In some instances, the types and amounts of products produced can be varied based on the quantity of sand added to the catalyst or a mixture of catalysts.

In the context of the present invention embodiments 1 to 60 are described. Embodiment 1 is a method for producing olefins and aromatic compounds from a hydrogen lean carbon containing feed. The method can include hydropyrolyzing the hydrogen lean carbon containing feed in the presence of a hydrogen donor feed under reaction conditions sufficient to produce a product that includes: (i) olefins and aromatic compounds; or (ii) a hydrocarbonaceous stream, wherein the hydrocarbonaceous stream is further processed into olefins and aromatic compounds, wherein the olefins and aromatic compounds from (i) or the hydrocarbonaceous stream from (ii) are each obtained by hydrogenation of the hydrogen lean carbon containing feed with the hydrogen donor feed and cracking of carbonaceous compounds comprised in the hydrogenated feed, and wherein the hydrogen donor feed includes at least one compound that donates hydrogen to carbonaceous compounds in the hydrogen lean feed, said at least one compound being a compound other than $H_2$. Embodiment 2 is the method of embodiment 1, wherein the reaction further includes reforming carbon compounds from the un-cracked or cracked hydrogenated feed to aromatics. Embodiment 3 is the method of any one of embodiments 1 to 2, wherein the reaction conditions include a temperature of about 400 to about 700° C. or a pressure range of atmospheric pressure to about 17.5 MPa or both. Embodiment 4 is the method of any one of embodiments 1 to 3, wherein the hydrogen lean carbon containing feed includes biomass, tires, sewage sludge, municipal solid waste, paper, coal, oil sands, oil shale, heavy petroleum oils, or bio oil, or combinations thereof. Embodiment 5 is the method of embodiment 4, wherein the hydrogen lean carbon containing feed comprises biomass. Embodiment 6 is the method of embodiment 5, wherein the biomass comprises plant material, tree material, aquatic material, or a mixture thereof. Embodiment 7 is the method of any one of embodiments 1 to 6, wherein the compound in the hydrogen donor feed that donates hydrogen to the carbonaceous compounds in the hydrogen lean feed is a $C_1$ to $C_4$ gas, naphtha or diesel liquids, Fischer-Tropsch liquids, virgin or waste polymers, wax or grease, hydrogen donor solvents, plastics, waste ammonia or urea or any combination thereof. Embodiment 7 is the method of embodiment 7, wherein the compound is a polymer. Embodiment 9 is the method of embodiment 8, wherein the polymer is a polyolefin, polyethylene, polypropylene, polystyrene, polyethylene terephthalate (PET), polyvinyl chloride (PVC), polyamide, polycarbonate, polyurethane, polyester, or any combination thereof. Embodiment 10 is the method of any one of embodiments 8 to 9, wherein the hydrogen lean carbon containing feed comprises biomass and the compound in the hydrogen donor feed that donates hydrogen to the carbonaceous compounds in the hydrogen lean feed is a polymer. Embodiment 11 is the method of any one of embodiments 1 to 10, wherein the hydrogen lean carbon containing feed includes 12 wt. % or less of hydrogen or preferably comprises 9 wt. % to 12 wt. % of hydrogen. Embodiment 12 is the method of embodiment 11, wherein the combination of the hydrogen lean carbon containing feed and the hydrogen donor feed includes greater than 12 wt. % of hydrogen. Embodiment 13 is the method of any one of embodiments 1 to 12, wherein the process of producing the olefins and aromatic compounds of (i) or the hydrocarbonaceous stream of (ii) is performed in a single reactor or in two reactors in series with one another. Embodiment 14 is the method of embodiment 13, wherein a single reactor is used. Embodiment 15 is the method of any one of embodiments 13 or 14, wherein the reactor is a fixed-bed reactor, a fluidized bed reactor, a bubbling bed reactor, a slurry reactor, or a rotating kiln reactor, or any combinations thereof when two reactors in series with one another are used. Embodiment 16 is the method of any one of embodiments 1 to 15, wherein the hydrocarbonaceous stream is further processed into olefins and aromatic compounds in a second stage or second reactor. Embodiment 17 is the method of embodiment 16, wherein the hydrocarbonaceous stream is further subjected to fluidized catalytic cracking (FCC) or steam cracking to produce olefins and aromatic compounds. Embodiment 18 is the method of any one of embodiments 1 to 17, wherein a catalyst is not used to produce the olefins and aromatic compounds of (i) or the hydrocarbonaceous stream of (ii). Embodiment 19 is the method of any one of embodiments 1 to 17, wherein the reaction is performed in the presence of a catalyst or a mixture of catalysts. Embodiment 20 is the method of embodiment 19, wherein the catalyst is capable of hydrogenating the hydrogen lean carbon containing feed with the hydrogen donor feed and cracking carbonaceous compounds. Embodiment 21 is the method of embodiment 20, wherein the catalyst is further capable of reforming carbonaceous compounds into aromatics. Embodiment 22 is the method of any one of embodiments 19 to 21, wherein sand is mixed with the catalyst in an amount of up to 99 wt. % of sand based on the total weight of the sand and catalyst combination. Embodiment 23 is the method of any one of embodiments 19 to 22, wherein the hydrogen lean carbon containing feed or the hydrogen donor feed, or both, are each fed into the reaction at a catalyst-to-feed ratio of 0.001 to 20 based on the combined feed. Embodiment 24 is the method of any one of embodiments 1 to 23, wherein one or more of the following reactions occur during a single-stage reaction process or occurs during a second-stage reaction process: (a) removal of side chains present on mono-aromatic compounds present in the un-cracked or cracked hydrogenated feed; (b) aromatization of paraffins, olefins, or naphthenes present in the un-cracked or cracked hydrogenated feed; (c) hydrogenation of coke or minimization of coke formation; (d) isomerization of compounds present in the un-cracked or cracked hydrogenated feed; or (e) hydrodeoxygenation of compounds present in the un-cracked or cracked hydrogenated feed to aromatics. Embodiment 25 is the method of any one of embodiments 1 to 24, wherein any $H_2$ gas produced during the process is recycled and combined with the hydrogen donor feed. Embodiment 26 is the method of any one of embodiments 1 to 25, wherein at least two different hydrogen lean carbon containing feeds are used, wherein the first hydrogen lean carbon containing feed includes a hydrogen content wt. % that is less than the second hydrogen lean carbon containing feed, and wherein the first hydrogen lean carbon containing feed is introduced upstream from the second hydrogen lean carbon containing feed.

Embodiment 27 is a method for producing olefins and aromatic compounds from a hydrogen rich carbon containing feed. The method includes hydropyrolyzing the hydrogen rich carbon containing feed under reaction conditions sufficient to produce a product that includes: (i) olefins and aromatic compounds; or (ii) a hydrocarbonaceous stream, wherein the hydrocarbonaceous stream is further processed into olefins and aromatic compounds, wherein the olefins and aromatic compounds from (i) or the hydrocarbonaceous stream from (ii) are each obtained in a single stage by cracking of carbonaceous compounds in the hydrogen rich carbon containing feed. Embodiment 28 is the method of embodiment 27, wherein the hydrogen rich carbon containing feed comprises a polymer or a plastic material. Embodiment, 29 is the method of embodiment 28, wherein the polymer is a virgin polymer, a waste polymer, or a combination thereof. Embodiment 30 is the method of any one of embodiments 27 to 29, wherein the polymer is a polyolefin, polyethylene, polypropylene, polystyrene, polyethylene terephthalate (PET), polyvinyl chloride (PVC), polyamide, polycarbonate, polyurethane, polyester, or any combination thereof. Embodiment 31 is the method of any one of embodiments 27 to 30, wherein the hydrogen rich carbon containing feed comprises greater than 12 wt. % of atomic hydrogen. Embodiment 32 is the method of any one of embodiments 27 to 31, wherein the reaction further includes reforming carbon compounds from the hydrocarbonaceous stream to aromatics. Embodiment 33 is the method of any one of embodiments 27 to 32, wherein the reaction conditions include a temperature of about 400 to about 700° C. or a pressure range of atmospheric pressure to about 17.5 MPa or both. Embodiment 34 is the method of any one of embodiments 27 to 33, wherein the process of producing the olefins and aromatic compounds of (i) or the hydrocarbonaceous stream of (ii) is performed in a single reactor or in two reactors in series with one another. Embodiment 35 is the method of embodiment 34, wherein a single reactor is used. Embodiment 36 is the method of any one of embodiments 27 to 35, wherein the reactor is a fixed-bed reactor, a fluidized bed reactor, a bubbling bed reactor, a slurry reactor, or a rotating kiln reactor, or any combinations thereof when two reactors in series with one another are used. Embodiment 37 is the method of any one of embodiments 27 to 36, wherein the hydrocarbonaceous stream is further processed into olefins and aromatic compounds in a second stage or second reactor. Embodiment 38 is the method of embodiment 37, wherein the hydrocarbonaceous stream is further subjected to fluidized catalytic cracking (FCC) or steam cracking to produce olefins and aromatic compounds. Embodiment 39 is the method of any one of embodiments 27 to 38, wherein a catalyst is not used to produce the olefins and aromatic compounds of (i) or the hydrocarbonaceous stream of (ii). Embodiment 40 is the method of any one of embodiments 27 to 39, wherein the reaction is performed in the presence of a catalyst or a mixture of catalysts. Embodiment 41 is the method of embodiment 40, wherein the catalyst is further capable of reforming carbonaceous compounds into aromatics. Embodiment 42 is the method of any one of embodiments 40 to 41, wherein the catalyst includes a fluidized catalytic cracking (FCC) catalyst, a zeolite catalyst, a hydrodeoxygenation (HDO) catalyst, hydrocracking catalyst, an aromatization catalyst, or any combination thereof. Embodiment 43 is the method of any one of embodiments 40 to 42, wherein sand is mixed with the catalyst in an amount of up to 25 wt. % of sand based on the total weight of the sand and catalyst combination. Embodiment 44 is the method of any one of embodiments 27 to 43, wherein one or more of the following reactions occur: (a) removal of side chains present on mono-aromatic compounds present in the un-cracked or cracked hydrogen rich carbon containing feed; (b) aromatization of paraffins, olefins, or naphthenes present in the un-cracked or cracked hydrogen rich carbon containing feed; (c) hydrogenation of coke or minimization of coke formation; (d) isomerization of compounds present in the un-cracked or cracked hydrogen rich carbon containing feed; or (e) hydrodeoxygenation of compounds present in the un-cracked or cracked hydrogen rich carbon containing feed to aromatics. Embodiment 45 is the method of any one of embodiments 27 to 44, wherein any $H_2$ gas produced during the process is recycled and combined with the hydrogen donor feed. Embodiment 46 is the method of any one of embodiments 27 to 45, wherein the process is a continuous process. Embodiment 47 is the method of any one of embodiments 27 to 46, wherein the majority of the product produced by the reaction is olefins and aromatic compounds from (i) or the hydrocarbonaceous stream from (ii). Embodiment 48 is the method of any one of embodiments 27 to 47, wherein a carrier gas is used in combination with the hydrogen rich carbon containing feed. Embodiment 49 is the method of embodiment 48, wherein the carrier gas includes 5% to 15%, by volume, of hydrogen gas and the 95% to 85%, by volume, of nitrogen gas, helium gas, or argon gas, or any combination thereof. Embodiment 50 is the method of embodiment 49, wherein the carrier gas includes 5% to 15%, by volume of hydrogen gas and 95% to 85%, by volume, of nitrogen gas.

Embodiment 50 is a catalyst capable of producing (i) olefins and aromatic compounds or (ii) a hydrocarbonaceous stream that can be further processed to olefins and aromatic compounds from a hydrogen lean carbon containing feed, a hydrogen rich carbon containing feed, or a combination thereof, the catalyst includes (a) sand; and (b) a fluidized catalytic cracking (FCC) catalyst, a zeolite catalyst, a hydrodeoxygenation (HDO) catalyst, a hydrocracking catalyst, an aromatization catalyst, or any combination thereof, wherein the amount of sand in the catalyst includes up to 25 wt. % of the catalyst. Embodiment 51 is the catalyst of embodiment 51, including up to 25 wt. % of sand in the catalyst. Embodiment 52 is the catalyst of any one of embodiments 51 to 52, wherein the sand is quartz sand, pure silica sand, or sand with metal or metal oxide contaminants. Embodiment 54 is the catalyst of any one of embodiments 51 to 53, wherein the catalyst is an FCC catalyst selected from the group consisting of a X-type zeolite, a Y-type or USY-type zeolite, mordenite, faujasite, nano-crystalline zeolites, MCM mesoporous materials, SBA-15, a silico-alumino phosphate, a gallophosphate, a titanophosphate, or any combination thereof present as is, or present in an active or inactive matrix. Embodiment 55 is the catalyst of any one of embodiments 51 to 54, wherein the catalyst is a zeolite catalyst selected from the group consisting of ZSM-5, ZSM-11, ferrierite, heulandite, zeolite A, erionite, and chabazite, or any combination thereof present as is, or present in an active or inactive matrix. Embodiment 56 is the catalyst of any one of embodiments 51 to 55, wherein the catalyst is an HDO catalyst selected from the group consisting of a mono, bi or multi-metals on in-active or active support. Embodiment 57 is the catalyst of any one of embodiments 51 to 56, wherein the catalyst further includes up to 8 wt. % of metal loaded on the catalyst. Embodiment 58 is the catalyst of embodiment 57, wherein the metal is a noble metal or a transition metal or a metal oxide, or combinations thereof. Embodiment 59 is the catalyst of any one of embodiments 51 to 58, wherein the catalyst includes a mixture of metal loaded FCC and metal loaded ZSM-5. Embodiment 60 is the catalyst of any one of embodiments 51 to 59, wherein the catalyst is an integrated particle or is in particulate form.

The following includes definitions of various terms and phrases used throughout this specification.

The term "hydrogen lean carbon containing feed" refers to a mixture of compounds where a total atomic hydrogen (H) content of the mixture is 12 wt. % or less.

The term "hydrogen donor feed" refers to a mixture of compounds where a total atomic hydrogen (H) content of the mixture is greater than 12 wt. %.

The term "hydrogen rich carbon containing feed" refers to a mixture of compounds where a total atomic hydrogen content of the mixture is greater than 12 wt. %.

The term "hydropyrolysis" refers to the cracking and hydrogenation of hydrocarbonaceous compounds. In some instances, an external water source can be used, but is not required.

The term "olefins" refers to a linear, a branched, or a cyclic array of atoms that is composed of at least two carbon atoms. Olefins may include branched, linear or cyclic aliphatic groups, branched, linear, or cyclic alkyl groups, substituted or unsubstituted aromatic groups, heteroatoms, or any combination thereof. Examples of olefins include, but are not limited to, ethylene, butene, propene, iso-butylene, pentene, cyclopentene, cyclohexene, and the like. "Light" olefins refer to olefins having a carbon number of 4 or less.

The term "aromatic" refers to an array of atoms having a valence of at least one and includes at least one aromatic group. The array of atoms may include heteroatoms such as nitrogen, sulfur, selenium, silicon and oxygen, or may be composed exclusively of carbon and hydrogen. The aromatic group may also include nonaromatic components.

The term "hydrocarbonaceous stream" refers to a product stream from hydropyrolysis that includes compounds that are reduced in molecular weight as compared to the starting feed. Examples of such compounds include, but are not limited to, saturated aromatics, substituted aromatics, paraffins, cycloalkanes, oxygenated compounds, naphthenes, olefins, or mixtures thereof. "Heavies or heavy hydrocarbons" refer to compounds or hydrocarbons having a boiling point greater than 370° C.

The term "Group" or "Groups" refers to the family of elements of the Chemical Abstract Services (United States) version of the Periodic Table.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods and catalysts of the present invention can "comprise," "consist essentially of," or "consist of" particular components, compositions, ingredients etc. disclosed throughout the specification. With respect to the transitional phase "consisting essentially of," in one non-limiting aspect, a basic and novel characteristic of the methods and catalysts of the present invention are their ability to efficiently produce olefins and aromatics or hydrocarbonaceous streams that are further processed into olefins and aromatic compounds.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further aspects, features from specific aspects may be combined with features from other aspects. For example, features from one aspect may be combined with features from any of the other aspects.

BRIEF DESCRIPTION OF THE DRAWINGS

Features and advantages of the methods and apparatus of the present invention will be more fully appreciated by reference to the following detailed description of presently preferred but nonetheless illustrative embodiments of the present invention when taken in conjunction with the accompanying drawings.

Figure 1:
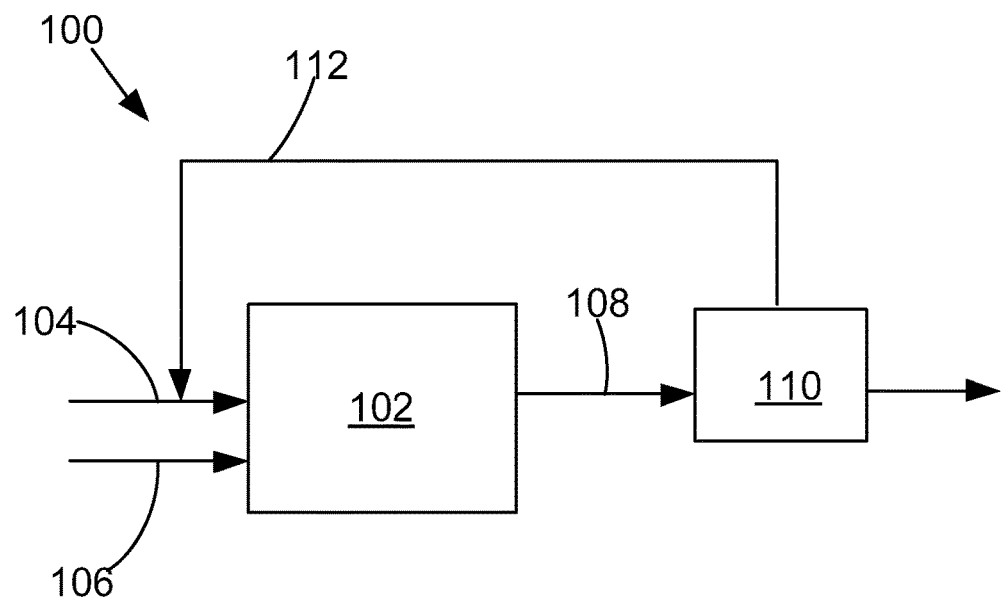
FIG. 1 depicts a schematic representation of an embodiment of processing a hydrogen lean carbon containing feed in a single stage process.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION

While hydropyrolysis of biomass and other unconventional carbon sources is known, the yield and quality of producing olefins and aromatics from such feedstocks remains largely inefficient. One potential cause of this is the instability of the intermediates produced during the hydropyrolyzing process. For example, during pyrolysis of biomass, formation of radicals may cause polymerization of molecules or coking or both. Conventional processes add molecular hydrogen during the pyrolysis process to control the polymerization and coking reactions. $H_2$ is also used as a hydrogen source for hydrogenation of the products resulting from the pyrolysis reactions. The use of molecular hydrogen ("hydrogen gas" or "$H_2$") may be economically undesirable due to the cost of producing and storing hydrogen gas.

The present discovery offers a solution to these inefficiencies by using hydrogen rich carbonaceous streams as a hydrogen donor source during the hydropyrolysis of hydrogen lean carbonaceous streams. The hydropyrolysis may be a single-stage or a multi-stage process. By single-stage, it is meant that olefins or aromatics, or both, can be produced directly from the hydropyrolysis step. By multi-stage, it is meant that the product produced from hydropyrolysis (e.g., intermediate hydropyrolyzed product) can be further processed in a second stage or second reaction to produce the desired olefins or aromatics, or both.

These and other non-limiting aspects of the present invention are provided in the following subsections.

A. Hydrogen Lean and Hydrogen Donor Feeds

Hydrogen lean carbon containing feeds in the context of the present invention can include, but are not limited to, biomass, tires, sewage sludge, municipal solid waste, paper, coal, oil sands, oil shale, heavy petroleum oils, bio oils, pyrolysis oils produced as a result of pyrolysis of biomass, plastics, algal oils plant seed oils, oils and residues form plant or animal source, or any combination of the above. Biomass includes, but is not limited to, plant material, tree material, aquatic material, or any combination thereof. In a preferred embodiment, the hydrogen lean carbon containing feed is biomass. The hydrogen lean carbon containing feed of the present invention has an atomic hydrogen (H) content of 12 wt. % or less, about 10 wt. % or about 5 wt. %. In a preferred embodiment, the hydrogen lean carbon containing feed has a hydrogen content from about 7 wt. % to about 9 wt. %.

A hydrogen donor feed stream in the context of the present invention includes compounds that are capable of donating an atomic hydrogen to the carbonaceous compounds in the hydrogen lean carbon containing feed. While hydrogen gas can be supplemented or added to the hydrogen donor feed, hydrogen gas is not needed in said hydrogen donor feed stream. Rather, compounds capable of donating atomic hydrogens can be used in the context of the present invention as the hydrogen donor source. Such compounds can be hydrocarbons, oligomers, polymers, ammonia, urea, or any combination thereof. Not to be bound by theory, it is believed that the compounds in the hydrogen donor feed react with one another to provide atomic hydrogen (for example, hydrogen radicals) to the carbonaceous compounds in the hydrogen lean carbon containing feed. Examples of hydrocarbons include, but are not limited to, natural or synthetic hydrocarbons, hydrocarbon gas having a carbon number from 1 to 4 ($C_1$ to $C_4$), naphtha or diesel liquids, synthetic hydrocarbons (for example, Fischer-Tropsch liquids), wax, grease, hydrogen donor solvents, or any combination thereof. Polymers include virgin or waste polymers. In a preferred embodiment, the hydrogen donor feed is substantially polymeric compounds or a mixture of polymers. Examples of polymers include thermosetting polymers, thermoplastic polymers, elastomers, synthetic fibers, polyethylene, poly(ethylene oxide) polymers, polypropylene, polyvinyl chloride, polystyrene, polyurethanes polyamides, polyacrylnitriles, poly(ethylene terephthalate), copolymers, plastics, and the like. The hydrogen donor feed stream has a total atomic hydrogen (H) content of greater than 12 wt. % (e.g., 12.1, 12.5, 13, 14, 15, 16, 17, 18, 19, 20 wt. % or more). In a preferred embodiment, the hydrogen donor feed has a hydrogen content from greater than 12 wt. % to 20 wt. %, or 13 wt. % to 17 wt. %. In still more particular aspects, the hydrogen donor feed can include about 1 wt. % or less of molecular hydrogen, about 0.5 wt. % or less of molecular hydrogen, or about 0.001 wt. % or less of molecular hydrogen.

A hydrogen rich carbon containing feed, which can be the same as a hydrogen donor feed stream, can include plastics, polymers, hydrocarbons, etc., having a total atomic hydrogen content of greater than 12 wt. % (e.g., 12.1, 12.5, 13, 14, 15, 16, 17, 18, 19, 20 wt. % or more). In a preferred embodiment, the hydrogen rich carbon containing feed stream has a hydrogen content from greater than 12 wt. % to 20 wt. %, or 13 wt. % to 17 wt. %. The hydrogen rich carbon containing feed can be used in the context of the present invention without a hydrogen donor feed stream. Instead, the hydrogen rich carbon containing feed can be pyrolyzed to directly produce the desired aromatic or olefin compounds, or a combination of such compounds. In instances when a catalyst is used, hydrogen ($H_2$) can be used with a hydrogen rich carbon containing feed or hydrogen donor feeds to alter agglomeration of material on the catalyst or activate the catalyst.

B. Single Stage and Multi-Stage Processes

Single stage and multi-stage processes can be used in the context of the present invention to treat hydrogen lean carbon containing feeds and hydrogen rich carbon containing feeds. Generally, the hydrocarbonaceous feed can be hydropyrolyzed to olefins and aromatic compounds or to a hydrocarbonaceous stream that is capable of being further processed to olefins and aromatic compounds. When a hydrogen lean carbonaceous feed is used it is preferable to also use a hydrogen donor source of the present invention. The hydrogen donor source may be one or more hydrocarbons that react to provide hydrogen atoms to one or more compounds in the hydrogen lean carbonaceous feed. Non-limiting examples of single stage (FIG. 1) and multi-stage processes (FIG. 2) are provided below.

Referring to FIG. 1, FIG. 1 is a schematic of hydropyrolysis system 100 that includes a single stage reactor 102. Examples of reactors that can be used in the context of the present invention include fixed-bed reactors, stacked bed reactors, fluidized bed reactors, ebullating bed reactors, slurry reactors, rotating kiln reactors, continuously stirred tank reactors, spray reactors, or liquid/liquid contactors. The hydrogen lean carbon containing feed (for example, wood having a hydrogen content of 6 wt. % to 7 wt. %) enters the single stage reactor 102 via a hydrogen lean carbon containing feed inlet 104. Hydropyrolysis of a hydrogen lean carbon containing feed or a hydrogen rich carbon containing feed in system 100 may be a continuous process or a batch process. In some embodiments, the single stage reactor 102 can also include one or more catalysts (for example, two catalysts). Non-limiting examples of catalysts that can be used in the context of the present invention are provided throughout this specification. The system 100 can also include a hydrogen donor feed inlet 106 to transfer a hydrogen donor feed (for example, a virgin polymer, a waste polymer, or mixtures thereof) into the single stage reactor 102. Alternatively, the hydrogen lean carbon containing feed and the hydrogen donor feed streams can be simultaneously placed into the reactor 102 via a single inlet 104 or 106 such that the hydrogen lean carbon containing feed is mixed with the hydrogen donor feed and enters the reactor 102 as a one stream mixture. Still further, the system 100 can be configured to have the hydrogen lean carbon containing feed enter the reactor 102 downstream from the entrance of the hydrogen donor feed. Alternatively, the system 100 can be configured to have the hydrogen lean carbon containing feed enter the reactor 102 upstream from the entrance of the hydrogen donor feed. In still other embodiments, the system 100 can be configured to have the hydrogen lean carbon containing feed and the hydrogen donor feed enter the reactor 102 at approximately the same time and position in the reactor 102 relative to one another. By way of example only, in certain instances, it may be advantageous to have a very deficient hydrogen carbon containing feed (e.g., less than 6 weight percent of hydrogen content in the feed) to enter downstream of the hydrogen donor feed to allow time for the hydrogen donor feed to generate hydrogen for the hydrogen lean carbon containing feed. By comparison, it may be more advantageous to have a hydrogen lean carbon containing feed having a hydrogen content of 6 wt. % or more to enter simultaneously with the hydrogen donor feed to allow for less reaction time with the hydrogen donor feed. In any instance, the placement of the inlets 104 and 106 can be positioned to achieve a desired result. Once the reaction between the hydrogen lean carbon containing feed and the hydrogen donor feed takes place, the product (e.g., olefins, aromatic compounds, or hydrocarbonaceous stream, or mixtures thereof) can exit the reactor 102 via an outlet 108. In the reactor 102, hydrogen gas ($H_2$) can be generated via the reaction process and removed from the product via separation unit 110. Separation unit 110 may be any known separation unit capable of separating hydrogen gas from hydrocarbons, for example, a membrane separation unit, or gas/liquid separation unit. If desired, the produced hydrogen gas and/or any gaseous hydrocarbons can then be recycled by adding it to the hydrogen donor feed via a conduit 112. The recycled hydrogen gas can be used to reduce coke formation in the reactor 102 or manage coke lay down on the catalyst.

Figure 2:
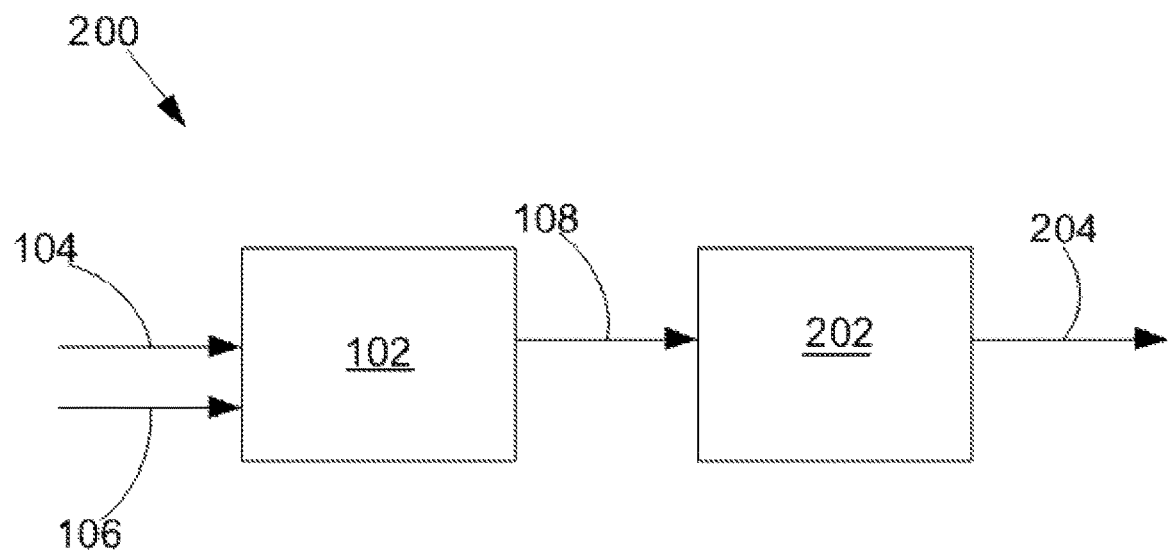
FIG. 2 is a schematic of an embodiment of a system that includes a multiple stage reactor.
Figure 3A:
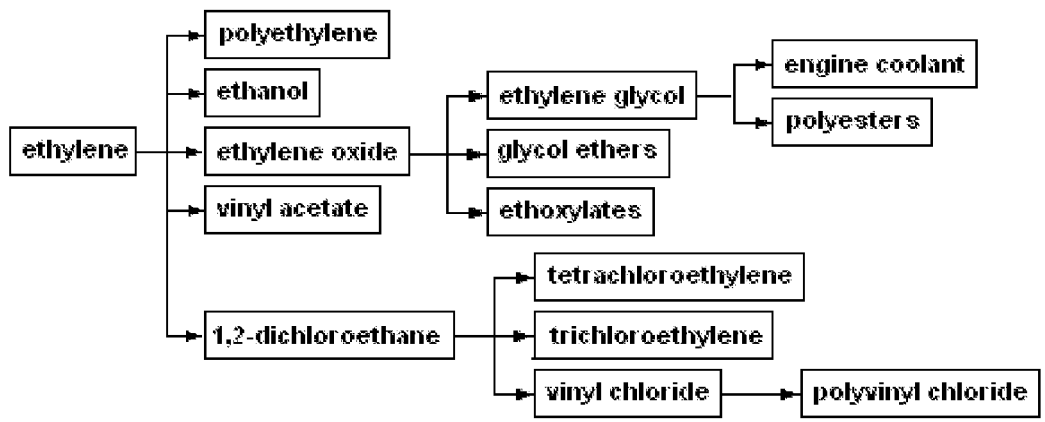
FIG. 3 illustrates some of the chemicals that can be produced from (A) ethylene, (B) propylene, (C) benzene, (D) toluene, and (E) xylenes.
Figure 3B:
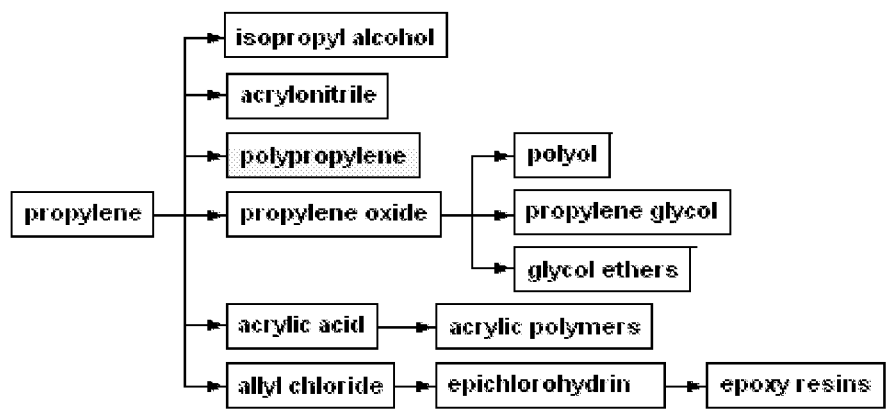
Figure 3C:
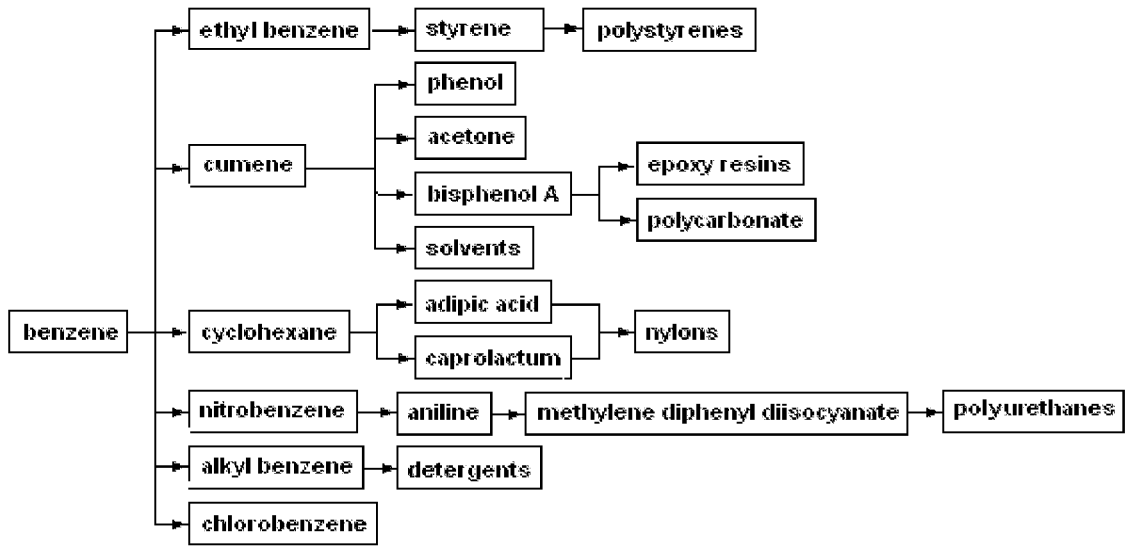
Figure 3D:
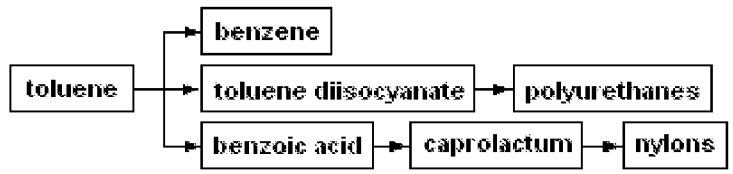
Figure 3E:
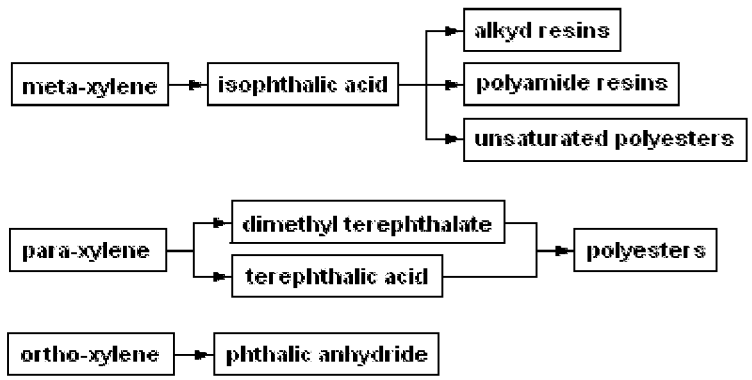

Referring to FIG. 2, FIG. 2 is a schematic of a multi-stage system 200 that can include a reactor 102 (such as that used in the single-stage system 100) and at least a second reactor 202. The second reactor 202 can be the type of reactor as 102 or can be a different type of reactor than 102. Non-limiting examples of reactors that can be used for the reactor 202 include fixed-bed reactors, stacked bed reactors, fluidized bed reactors, ebullating bed reactors, slurry reactors, rotating kiln reactors, continuously stirred tank reactors, spray reactors, or liquid/liquid contactors. When the product produced in reactor 102 includes a mixture of olefins, aromatics, and other compounds, it can exit the outlet 108 and then be further processed in reactor 202 to further convert the other compounds into olefins and aromatics. Non-limiting examples of these other compounds can include paraffins or naphthenes. Alternatively, the second reactor 202 can process the olefins and aromatics into additional downstream products that are desired in the chemical industry. Non-limiting examples of the further processing of olefins (e.g., ethylene, propylene) and aromatics (e.g., benzene, toluene, xylenes) is provided in FIGS. 3A-3E. Still further, when the product produced in reactor 102 includes a hydrocarbonaceous stream, the product can exit the outlet 108 and then be further processed in reactor 202 to further convert the hydrocarbonaceous stream into olefins and aromatics. Still further, and while not illustrated, it is contemplated that additional reactors can be added to the multi-stage system 200 so as to produce a desired end product. Alternatively, intermediate products can be isolated and used in other reactor systems to produce a desired end product. In either instance, an outlet 204 can be used to isolate or collect the produced intermediate or end products. Also, the system 200 can be set up such that 102 and 202 are separate or different stages or positions in the same reactor.

Figure 4:
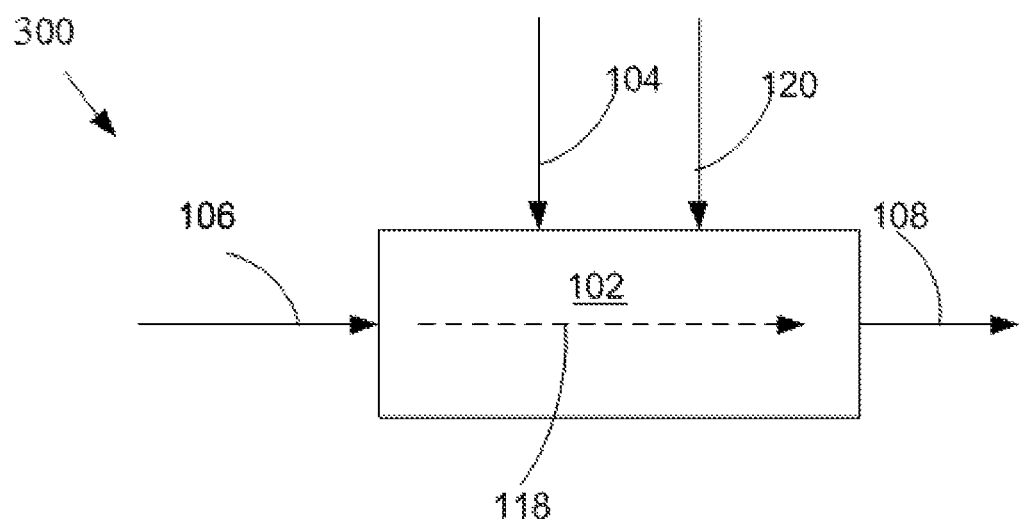
FIG. 4 depicts a schematic representation of an embodiment of processing multiple hydrogen lean carbon containing feeds.

In still other embodiments of the present invention, it is contemplated that multiple hydrogen lean carbon containing feeds can be processed at the same time. For instance, one hydrogen lean carbon containing feed could include a biomass (e.g., wood) while the other could include bio oil. In such instances, it may be that the different streams would have different amounts of hydrogen content. Therefore, the stream having less hydrogen content could benefit from a longer contact time with a hydrogen donor stream than the stream having more hydrogen content. Therefore, the inlets for each hydrogen lean carbon containing feed can be positioned relative to the inlet for the hydrogen donor feed. By way of example, FIG. 4 depicts a schematic of a single stage system 300 that includes a rector 102 with multiple inlets. A hydrogen donor feed can enter the reactor 102 via inlet 106. The dashed arrow 118 depicts the flow of hydrogen donor feed stream through the reactor 102. A first hydrogen lean carbon containing feed can be introduced into via inlet 104, while a second hydrogen lean carbon containing feed can be introduced via inlet 120, which is placed downstream from inlet 104. In this set up, the first hydrogen lean carbon containing feed can have less hydrogen content than the second stream. By placing inlet 104 upstream from inlet 120, the first hydrogen lean carbon containing feed can have a longer contact time with the hydrogen donor stream, while the second hydrogen lean carbon containing feed can have a shorter contact time with the hydrogen donor stream. This allows for two different hydrogen lean carbon streams to be processed at the same time to maximize the olefin or aromatic production or to maximize the production of a carbonaceous stream that is further processed into olefins or aromatics. In some instances, the inlets 104 and 120 are positioned at the same location in the reactor 102; however, the positioning of the inlets as shown in FIG. 4 is preferred. In some instances, the introduction of feed through the inlets 104 and 120 is automated to allow feed to be provided to the reactor 102 based on the composition of the stream exiting outlet 108. In a non-limiting example, the inlets 104 and 120 and/or the outlet 108 can be equipped with an electronic control system and/or analysis equipment to monitor the composition of the hydrocarbonaceous mixture exiting the outlet 108 and provide electronic communication to valves associated with the inlets 104 and 120 to operate the valves (for example, open or close the valves) in response to the composition of exiting mixture.

Figure 5:
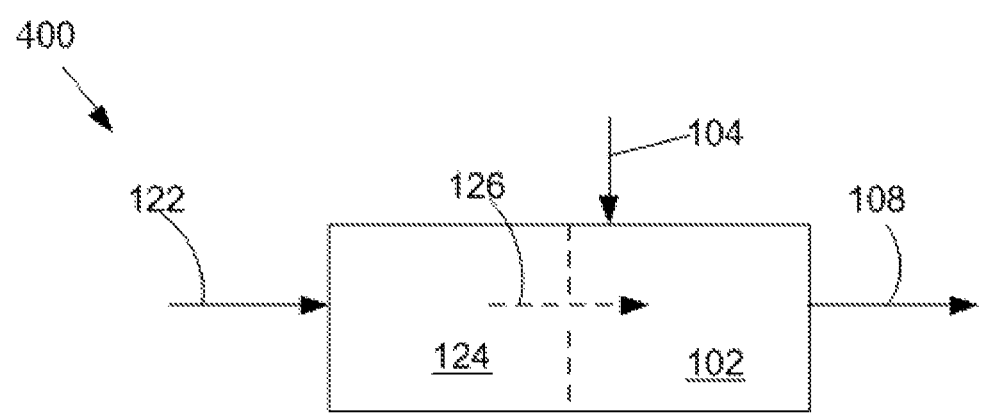
FIG. 5 depicts a schematic representation of an embodiment of using ammonia or urea as a hydrogen donor feed.

In still other embodiments, the hydrogen donor stream can include a nitrogen containing compound, for example, ammonia or urea compounds. In such embodiments, the ammonia or urea hydrogen donor stream can be introduced upstream of the reactor 102. FIG. 5 depicts a schematic of a system 400 that includes an ammonia or urea hydrogen donor feed. The reactor in this system 400 includes a first stage 124 and a second stage 102. A urea or ammonia stream can enter the first stage 124 via inlet 122. Stage 124 can include a catalyst that is capable of converting the ammonia or urea to hydrogen gas. For example, the catalyst may be a nickel-tungsten type catalyst. The ammonia and/or urea are contacted with the catalyst in stage 124 at temperatures sufficient to convert the ammonia and/or urea to a gas stream comprising hydrogen gas, nitrogen, and water. The gas stream can flow into stage 102 as shown by dashed arrow 126. A hydrogen lean carbon stream can be introduced into the second stage 102 via inlet 104, thereby contacting the hydrogen gas containing stream 126 to generate desired products (e.g., olefins, aromatics, carbonaceous stream that can be further processed into olefins and aromatics). This set-up allows for different processing conditions within the first 124 and second 102 stages of a reactor. In some embodiments, however, stage 124 and stage 102 can be separate reactors.

C. Processing Conditions

The reaction processing conditions in the reactor 102 or the reactor 202, or both, can be varied to achieve a desired result (e.g., olefin product, aromatic production, hydrocarbonaceous product that can be further converted into olefins or aromatics, etc.). In one non-limiting aspect, the hydrogen lean carbon containing feed can be contacted with a catalyst (or a mixture of catalysts) in the presence of a hydrogen donor feed to produce olefins, aromatics, or hydrocarbonaceous products to be further processed into olefins and aromatics. The processing conditions include temperature, pressure, hydrogen donor flow, hydrogen lean carbon containing feed flow, hydrogen rich carbon containing feed flow, or any combination thereof. Processing conditions are controlled, in some instances, to produce products with specific properties. Temperature may range from about 400° C. to about 750° C., from about 450° C. to about 700° C., or from about 500° C. to about 650° C. Pressures may range from about 0.1 megapascal (MPa) to about 20 MPa, from about 1 MPa to about 15 MPa, or from about 5 MPa to about 10 MPa. Weight hourly space velocity (WHSV) for the hydrogen lean carbon containing feed or the hydrogen rich carbon containing feed can be from 0.01 to about 10 $h^{-1}$. WHSV for the hydrogen donor feed can range from 0.01 to about 10 $h^{-1}$. In some embodiments, a carrier gas may be combined with the hydrogen donor feed and recirculated through the stages. Non-limiting carrier gases include nitrogen, helium, argon, steam, hydrocarbon rich product gas generated in the process, hydrocarbon gas having one or more of $C_1$ to $C_4$ carbon compounds. In some embodiments, the carrier gas includes 5%, 6%, 7%, 8%, 9%, 10%, 11%, 12%, 13%, 14%, or 15% or any range there between, by volume or mole, of hydrogen gas and the 95% to 85%, by volume, of nitrogen gas, helium gas, or argon gas, steam, hydrocarbon gas having one or more of $C_1$ to $C_4$ carbon compounds, or any combination thereof. The carrier gas may enhance mixing in the stage. In some instances steam can be used as a carrier gas in a once-through mode. In other instances, a combination of steam and carrier gases can be used with condensation of steam in the reactor downstream section. Most preferred carrier gases are steam and hydrocarbon product gas to facilitate reactor downstream product condensation. In one aspect, a carrier gas stream includes lift or acceleration gas if a fluidized bed reactor is used. Carrier gas stream can also include any gases used in aiding transfer of solid feed to reactor or any other gases entering the reaction zone. The process conditions may be adjusted depending on the hydrocarbonaceous feed used and the product distribution or slate of desired products. Severity of the process conditions may be manipulated by changing, the hydrogen donor feed, pressure, flow rates of various feed streams and/or carrier streams, the temperature of the process, and, if a catalyst is used, the catalyst type and/or catalyst to feed ratio, feed or carrier gas pre-heat temperature, atomization of liquid feed to result in smaller droplets, contact time, or combinations thereof.

D. Catalysts and Reaction Products

In some embodiments, one or more catalysts or a mixture of catalysts are used in the processes of the present invention. The catalysts can be capable of catalytic cracking of large molecules and hydrogenation/dehydrogenation of compounds in the feed to produce a product that includes olefins and aromatics compounds, or a hydrocarbonaceous stream that is processed into olefins and aromatic compounds. The catalyst or mixture of catalyst may be chosen depending on the type of feed and quality of feed stock to be processed. Contacting the hydrocarbon feeds alone or in the presence of a hydrogen donor feed with the catalyst can result in the addition of hydrogen to hydrogen deficient compounds and cracking of large molecules to smaller molecules. Examples of addition of hydrogen to hydrogen deficient compounds includes, but are not limited to, saturation of aromatic compounds, saturation of olefins, opening of cyclic compounds, or any combination thereof. Cracking of large molecules to smaller molecules may produce a product that includes olefins and aromatic compounds or a hydrocarbonaceous stream that may be further processed into olefins and aromatic compounds. In some embodiments, the catalyst is capable of reforming carbonaceous compounds into aromatics.

In addition to hydrogenation and cracking of the compounds in the hydrocarbon feed stream, the following reactions may occur: (a) removal of side chains present on mono-aromatic compounds present in the un-cracked or cracked hydrogenated feed; (b) aromatization of paraffins, olefins, or naphthenes present in the un-cracked or cracked hydrogenated feed; (c) hydrogenation of coke or minimization of coke formation; (d) isomerization of compounds present in the un-cracked or cracked hydrogenated feed; (e) hydrodeoxygenation of compounds present in the un-cracked or cracked hydrogenated feed to aromatics (f) desulfurization of compounds and (g) denitrogenation of compounds, or any combination of (a) through (g). These reactions may occur in a single stage or positioned downstream of the stage. The same catalyst used for hydropyrolysis may be used to catalyze these reactions. In some embodiments, different catalysts are selected depending on the product produced after hydropyrolysis. The catalyst to facilitate the additional reactions may be positioned in a stage or reactor downstream of the stage or reactor where hydropyrolysis is being performed.

Catalysts used for the processes described herein may be supported or unsupported catalysts. The support may be active or inactive. The support may include, but is not limited to, silica, alumina, carbon titania, zirconia, zeolite, or any combination thereof. All of the support materials can be purchased or be made by processes known to those of ordinary skill in the art (e.g., precipitation/co-precipitation, sol-gel, templates/surface derivatized metal oxides synthesis, solid-state synthesis, of mixed metal oxides, microemulsion technique, solvothermal, sonochemical, combustion synthesis, etc.).

One or more of the catalysts may include one or more metals or one or more metal compounds. One or more metals or metal compounds thereof include transition metals. Supported catalyst may be prepared using generally known catalyst preparation techniques. In some embodiments, the support may be impregnated with metal to form a catalyst. Impregnation aids may or may not be used during preparation of the catalyst. Wet impregnation of supports may load the catalyst with one or more metals or compounds thereof. The impregnation may be repeated multiple times to add (load) different metals or metal compounds to the support or load the same metal on the catalyst in a step-wise manner.

In some embodiments, one or more of the catalysts includes one or more noble metals. Noble metals include, but are not limited to, ruthenium, rhodium palladium, platinum, silver, osmium, iridium, or any combination thereof. In some embodiments, the catalyst includes a noble metal or noble metal compound thereof, a metal from Group VIB or metal compound thereof, a non-noble Group VIII metal or a non-noble metal compound thereof, or any combination thereof. Group VIB metals include chromium, molybdenum and tungsten. Non-noble Group VIII metals include, iron, cobalt, nickel, or any combination thereof. In some embodiments, one catalyst will include a noble metal or noble metal compound and a second catalyst will include a Group VIB metal or a metal compound thereof. Specific compounds are disclosed above and throughout this specification. These compounds are commercially available from a wide range of sources (e.g., Sigma-Aldrich® Co. LLC (St. Louis, Mo., USA); Alfa Aesar GmbH & Co KG, A Johnson Matthey Company (Germany)). Catalysts described herein may be synthesized or be commercially obtained.

In some embodiments, a FCC catalyst is used to treat the hydrocarbonaceous feeds and/or the hydrocarbonaceous streams generated from treating the hydrocarbonaceous feeds. The FCC catalyst may be mixed with other catalyst or used in one or more stages. A FCC catalyst may include a X-type zeolite, a Y-type or USY-type zeolite, mordenite, faujasite, nano-crystalline zeolites, MCM mesoporous materials, SBA-15, a silico-alumino phosphate, a gallophosphate, a titanophosphate, a spent FCC catalyst, or any combination thereof. The FCC catalyst may include a naturally occurring metal or a metal that has been embedded in an active or in-active matrix. A zeolite includes, but is not limited to, ZSM-5, ZSM-11, aluminosilicate zeolite, ferrierite, heulandite, zeolite A, erionite, chabazite and any combination thereof. Zeolites are well known in the art and can be commercially obtained or synthesized (See, Singh and Dutta (2003) in Handbook of zeolite science and technology, eds. Auerbach et al. pp. 21-64).

In some embodiments, the HDO catalyst is used to treat the hydrocarbonaceous feeds or the olefins, aromatics, and/or the hydrocarbonaceous streams generated from treating the hydrocarbonaceous feeds. The HDO catalyst may be mixed with one or more of the catalyst used for hydropyrolysis or used in a stage downstream of the hydropyrolysis stage. The HDO catalyst hydrogenates and deoxygenates one of more oxygen compounds in the hydrocarbonaceous feeds. The HDO catalyst may include one or more metals, one or more metal compounds thereof on a support. The metal or metal compound thereof may be from Group VIB and/or Group VIII. At least one of the metal or metal compounds thereof used in a HDO catalyst include molybdenum, cobalt, nickel, iron, platinum, palladium, and any combination thereof. The metals or metal compounds thereof may be used alone or together. For example, the HDO catalyst may include cobalt and molybdenum, nickel and molybdenum, iron and molybdenum, palladium and molybdenum, platinum and molybdenum, or nickel and platinum. In some embodiments, the HDO catalyst also includes one or more zeolites or metal loaded zeolites. For example, the HDO catalyst may be mixed with a ZSM-5 catalyst or a metal loaded ZSM-5 catalyst.

In some aspects of the invention, a desulfurization and/or denitrogenation catalysts is used to remove nitrogen and sulfur from hydrocarbonaceous compounds. Non-limiting examples of desulfurization and/or denitrogenation catalysts include Co and Mo, Ni and Mo, W and Mo or other metal combinations on alumina. Catalyst currently available as pre-treatment catalysts for desulfurization and denitrogenation in hydrocracking processes, diesel hydrodesulphurization processes and vacuum gas oil hydrotreating processes can be used.

In some embodiments, the hydrocracking catalyst is used to hydropyrolysis or hydrogenation and crack hydrocarbonaceous compounds. The hydrocracking or hydrogenation catalyst may also remove heteroatoms, for example, sulfur, nitrogen and/or oxygen from the hydrocarbonaceous compounds. The hydrocracking catalyst can include a Group VIB metal or a metal compound thereof, a Group VIII metal or metal compound thereof, or any combination thereof. The Group VIB metal or a compound thereof includes molybdenum and/or tungsten. The Group VIII metal or a compound thereof includes nickel and/or cobalt. Non-limiting examples of metals used in a hydrocracking catalyst, include cobalt-molybdenum catalyst, nickel-molybdenum catalyst, and tungsten-molybdenum catalyst. The hydrocracking catalyst may be subjected to a sulfiding source (for example, hydrogen sulfide) to convert any metals or metal oxides to metal sulfides prior to use. The hydrocracking catalyst is a metal sulfide on a support, or an unsupported metal sulfide catalyst. An example of an unsupported metal sulfide catalyst is a molybdenum sulfide. In some embodiments, the hydrocracking catalyst is a zeolite, or a mixture of the hydrocracking catalyst and one or more zeolites.

The aromatization catalyst catalyzes the formation of aromatic compounds from paraffins, olefins or naphthenes. The aromatization catalyst may be mixed with other catalysts or used alone. For example, the aromatization catalyst is used in the hydropyrolysis stage or a stage downstream of the hydropyrolysis stage. In some embodiments, the aromatization catalyst includes a Group VIII noble metal or a metal compound thereof, a Group VIB metal or a metal compound thereof, tin or a tin compound, gallium or a gallium compound, or any combination thereof. The metal(s) may be supported on alumina, zeolites or any combination thereof. The aromatization catalyst may be mixed with a FCC catalyst. Non-limiting examples, of aromatization catalyst include platinum-molybdenum catalyst, tin-platinum catalyst, platinum-gallium catalyst, and platinum-chromium catalyst.

In one non-limiting aspect, a catalyst-to-feed ratio of about 0.001 to about 20, about 0.01 to 15, or about 0.1 to about 10 based on the total feed may be used in the reactors of the system. In some embodiments, a slurry of the catalyst and crude feed may include from about 0.001 grams to 10 grams, about 0.005 to 5 grams, or about 0.01 to 3 grams of catalyst per 100 grams of lean hydrogen carbon containing feed in the stage(s) of the reactor.

By way of example, the catalyst used in the processes of the present invention can include sand and at least one of a FCC catalyst, a zeolite catalyst, a hydrodeoxygenation (HDO) catalyst, a hydrocracking catalyst, an aromatization catalyst, a spent FCC catalyst, and any combination thereof. In one particular aspect of the invention, the catalyst is a spent fluidized catalytic cracking (FCC) catalyst mixed with a ZSM5 zeolite catalyst in a weight ratio of FCC:ZSM-5 of 3:1, 2.9:1, 2.8:1, 2.7:1, 2.6:1, 2.5:1, 2.4:1, 2.3:1, 2.2:1, 2.1:1, 2:1 1.8:1, 1.7:1, 1.5:1, 1:1 or any range there between. The catalyst can include 75 to 50 wt. %, or 62.5 wt % of a spent FCC catalyst and 25 to 50 wt. %, or 37.5 wt. % of a ZSM-5 catalyst.

E. Use of Sand With Catalysts

In some embodiments of the present invention, sand can be mixed with a given catalyst. Non-limiting examples of sand include, quartz sand, silica sand, sand containing metal or metal oxide contaminants, or any combination thereof. The use of sand may inhibit fouling of the catalyst by contaminants produced during the hydropyrolysis. Incorporation of sand in the catalyst helps in altering the catalyst acidity and provides a method to balance the thermal and catalytic activities in a pyrolysis process. A mixture of catalyst and sand can be used at the same or higher temperature than with only catalysts without sand used for the same conversion. Inclusion of sand with the catalyst may alter degradation properties as compared to using 100 wt. % sand. The amount of sand that can be used up to 99 wt. % based on the total amount of sand/catalyst mixture. Preferably up to 25 wt. % sand based on the total weight of the sand and catalyst combination can be used. In some embodiments, contact of a hydrocarbonaceous feed with a catalyst containing sand produces a product enriched in ethylene. In such a process, a ratio of ethylene to propylene may be increased by mixing sand with the catalyst. It was discovered that sand can be used in amounts of up to 25 wt. % of the total amount of the sand/catalyst mixture to increase the ethylene to propylene ratio without appreciable drop in yields of high value light gas olefins and aromatics.

By way of example, the catalyst used in the processes of the present invention can include sand and at least one of a FCC catalyst, a zeolite catalyst, a hydrodeoxygenation (HDO) catalyst, a hydrocracking catalyst, an aromatization catalyst, a spent FCC catalyst, and any combination thereof. For example, the catalyst may be a mixture of sand, a metal loaded spent FCC catalyst and a metal loaded ZSM-5 catalyst. In some embodiments, a catalyst contains sand, a spent FCC catalyst and a ZSM-5 catalyst. In some embodiments, the catalyst are integrated particles that include sand, a metal loaded FCC catalyst, a zeolite, a spent FCC catalyst and any combination thereof embedded in an active matrix, wherein the catalyst is capable of catalyzing cracking, aromatization, hydrogenation and dehydrogenation reactions. The catalyst may include a mixture of a metal loaded fluidized catalytic cracking (FCC) and a metal loaded ZSM-5 catalyst. In some instances, the catalyst may not contain sand and contains at least one of the above-catalysts.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Conversion of Hydrogen Lean Carbon Containing Feeds

Different mixtures of hydrogen lean carbon containing feeds (wood powder and high density polyethylene powder (HDPE, 200 microns particle size)) were pyrolyzed in a lab reactor using the conditions in Table 1 using nitrogen as carrier gas at a flow rate of 175 normal cc/min (Ncc/min). No hydrogen containing gas was introduced into the reactor and the operating pressure was atmospheric. The reactor was an in-situ fluidized bed tubular reactor having a length of 783 mm and an inner diameter of 15 mm, and was housed in a split-zone 3-zone tubular furnace with independent temperature control for each zone. The size of each zone was 9.3 inches (236.2 mm). The overall heated length of the reactor placed inside the furnace was 591 mm. The reactor wall temperature was measured at the center of each zone and was used to control the heating of each furnace zone. The reactor had a conical bottom and the reactor bed temperature was measured using a thermocouple housed inside a thermowell and placed inside the reactor at the top of the conical bottom. Also, the reactor wall temperature was measured at the conical bottom to ensure that the bottom of the reactor was hot. The reactor bottom was placed at the middle of the furnace bottom zone for minimizing the effect of furnace end cap heat losses and maintaining the reactor bottom wall temperature within a difference of 20° C. of the internal bed temperature measured. In Table 1, gas produced (make) from wood alone was calculated as follows:

Gas produced from wood=(Gas yield with mixed feed−(gas yield from pure HDPE×weight fraction of HDPE in feed))/weight fraction of wood in feed.

Light olefin gas produced from wood alone was calculated using the formula of:

Light olefin gas produced from wood=(light olefin gas yield with mixed feed−(light olefin gas yield from pure HDPE×weight fraction of HDPE in feed))/weight fraction of wood in feed.

Coke produced from wood alone is calculated using the formula of:

Coke produced from wood=(coke yield with mixed feed−(coke yield from pure HDPE×weight fraction of HDPE in feed))/weight fraction of wood in feed.

Catalyst A was spent FCC catalyst (62.50%)+ZSM-5 zeolite catalyst (37.5%). Catalyst B was spent FCC catalyst (75%)+ZSM-5 Zeolite catalyst (25%).

TABLE 1

| Feed type | Solid Powder | Solid Powder | Solid Powder | Solid Powder |
|---|---|---|---|---|
| Feed name | HDPE | 82% HDPE + 18% Wood | 50% HDPE + 50% Wood | 20% HDPE + 80% Wood |
| Catalyst name | A | B | A | A |
| C/F ratio, gm/gm | 6.01 | 5.98 | 9.02 | 5.96 |
| Reaction temperature at start, ° C. | 700 | 620 | 670 | 670 |
| Feed weight transferred, gm | 1.50 | 0.75 | 0.75 | 1.50 |
| Coke yield, wt. % | 1.85 | 4.87 | 10.38 | 22.52 |
| wt. % $H_2$, $C_1$-$C_4$ yield on normalized products | 54.92 | 38.89 | 31.38 | 18.64 |
| Gas make contribution from wood alone based on removal of contribution from HDPE | | −34.11 | 7.84 | 9.57 |
| Total Light gas olefins yield, wt. % | 41.01 | 29.52 | 21.60 | 8.67 |
| Light olefins make contribution from wood alone based on removal of contribution from HDPE, wt. % | | −22.81 | 2.19 | 0.58 |
| Total gas saturates, wt. % | 11.48 | 6.79 | 3.81 | 1.65 |
| $C_2$=/$C_2$sat, wt/wt | 8.94 | 7.74 | 7.12 | 3.56 |
| $C_3$=/$C_3$sat, wt/wt | 4.60 | 5.87 | 6.51 | 5.50 |
| $C_4$=/$C_4$sat, wt/wt | 2.24 | 3.10 | 4.53 | 6.80 |

TABLE 1-continued

| Feed type | Solid Powder | Solid Powder | Solid Powder | Solid Powder |
|---|---|---|---|---|
| Hydrogen Transfer Index (HTI) | 0.58 | 0.47 | 0.33 | 0.31 |
| Coke make contribution from wood alone based on removal of contribution from HDPE, wt. % | | 18.63 | 18.90 | 27.69 |

As can be seen from Table 1, the gas produced from wood alone decreases when the plastic content was increased from 20% to 50%, however, the yield of light olefins alone from wood increases up to a plastic content of 50% in feed and decreases after that. Cracking of plastic feed was observed to be faster than cracking of biomass. Less coking was observed during cracking of the plastic feed as compared to the biomass cracking process. Coke deposition during biomass cracking reduced the activity of catalyst as compared to the plastic cracking process. When plastic feed rich streams (82% plastic) are used in the mixture, the yield of gases from the mixture decreased as compared to mixtures having less than 50 wt. % plastic. Thus, the amount of gases and olefins produced may be adjusted based on the amount of hydrogen donor feed present in the mixture. The calculated coke produced for wood, only when the mixture of wood and plastic feed was pyrolyzed, demonstrated that with increasing amount of plastic in feed, the coke produced from wood alone was reduced. The hydrogen transfer index (HTI) for each of the reactions were determined from the ratio of (propane+butane yields)/propylene yields, and are listed in Table 1. It can be concluded from the hydrogen transfer index that as the plastic content in the feed was increased the product gases become saturated (hydrogen donor). Based on the above, it can also be concluded that recycle of $H_2$ rich gases and operating at higher pressures can improve the hydropyrolysis process.

Example 2

Conversion of Hydrogen Rich Carbon Containing Feeds

Treatment of a hydrogen rich carbon containing stream was performed using catalysts that included 0 wt. % sand, 25 wt. % sand, 50% sand and 100 wt. % sand. The catalyst having 50 wt. % sand was prepared by mixing 50 wt. % of pure silica sand (99% pure) with 50 wt. % of Catalyst A (Example 1, 62.5 wt. % spent FCC catalyst and 37.5 wt. % of ZSM-5 catalyst). The catalyst having 25 wt. % sand was prepared by mixing 25 wt. % of pure silica sand (99% pure) with 75 wt. % of Catalyst A (Example 1, 62.5 wt. % spent FCC catalyst and 37.5 wt. % of ZSM-5 catalyst). The catalyst having 0 wt. % sand was 100 wt. % Catalyst A (i.e., 62.5 wt. % spent FCC catalyst and 37.5 wt. % of ZSM-5 catalyst. Catalyst and powdered hydrogen rich carbon containing feed (mixed plastic and/or thermal polymers) was added to the reactor. The reactor was the same as the reactor described in Example 1. The plastic feed was in the form of a 200 micron plastic powder. The mixed plastic feed used in these experiments is listed in Table 2.

TABLE 2

| Material | Amount |
|---|---|
| HDPE | 19 wt. % |
| Low Density Polyethylene (LDPE) | 21 wt. % |

TABLE 2-continued

| Material | Amount |
|---|---|
| Polypropylene (PP) | 24 wt. % |
| $C_4$-LLDPE | 12 wt. % |
| $C_6$-Linear Low Density Polyethylene (LLDPE) | 6 wt. % |
| Polystyrene (PS) | 11 wt. % |
| Polyethylene terephthalate (PET) | 7 wt. % |

The FCC catalyst was a spent FCC catalyst obtained from an operating refinery. The FCC spent catalyst contained 0.23 wt. % residual coke. The ZSM-5 zeolite catalyst used was a commercially available ZSM-5 zeolite catalyst. The plastic feed was mixed with the catalyst containing sand by swirling in a cup and then fed into the reactor. A flow of $N_2$ gas at 175 Ncc/min was used as a fluidizing and carrier gas. Catalyst and powdered hydrogen rich carbon containing feed (mixed plastic) was added to the reactor after the reactor attained a temperature of about 700° C. under atmospheric conditions. Immediately after feed and catalyst mixture were added, products evolved out of the reactor and were collected for 10 minutes. Most of these products evolved in the first 2-3 minutes. The catalyst to feed ratio was 6.0. The conversion products from the reactor were collected and condensed in a condenser. The uncondensed products were collected in a gas collection vessel and the gas composition was analyzed using a refinery gas analyzer (M/s AC Analyticals B.V., The Netherlands). Liquid products were characterized for their boiling point distribution using a simulated distillation GC (M/s AC Analyticals B.V., The Netherlands). In addition a detailed hydrocarbon analysis (up to $C_{13}$ hydrocarbons) was carried out using a DHA analyzer (M/s AC Analyticals B.V., The Netherlands). The coke deposited on the catalyst was determined using an IR-based CO and $CO_2$ analyzer. The mass balances were determined by summing the yields of gas, liquid and coke. Individual product yields were determined and reported on a normalized product basis.

Figure 6:
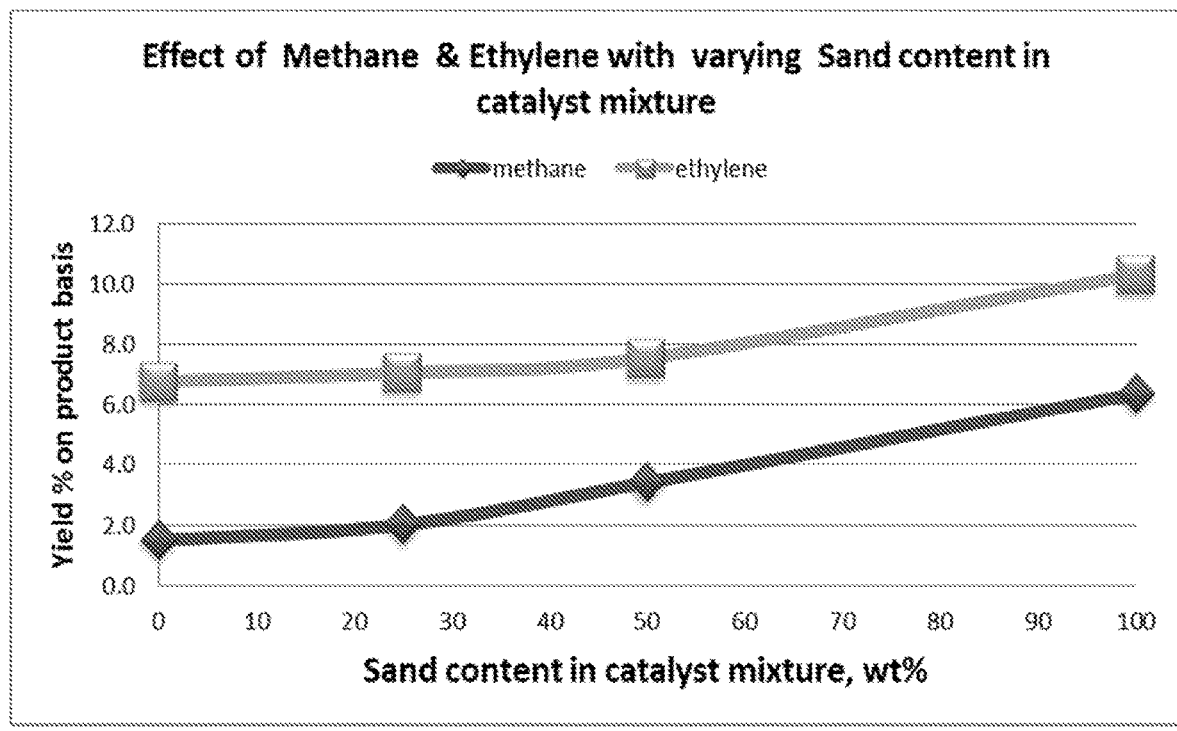
FIG. 6 is a graphical representation of the wt. % of methane and ethylene versus wt. % sand in the catalyst.
Figure 7:
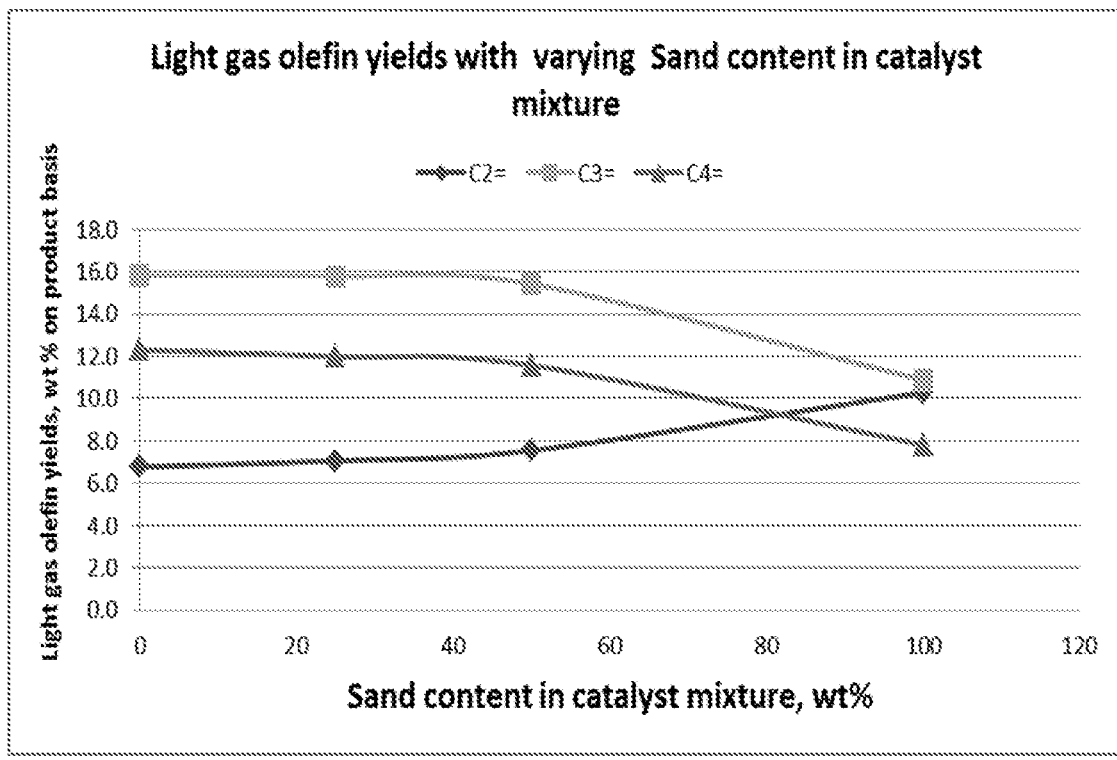
FIG. 7 is a graphical representation of the wt. % of $C_2$, $C_3$, and $C_4$ olefins versus wt. % sand in the catalyst.
Figure 8:
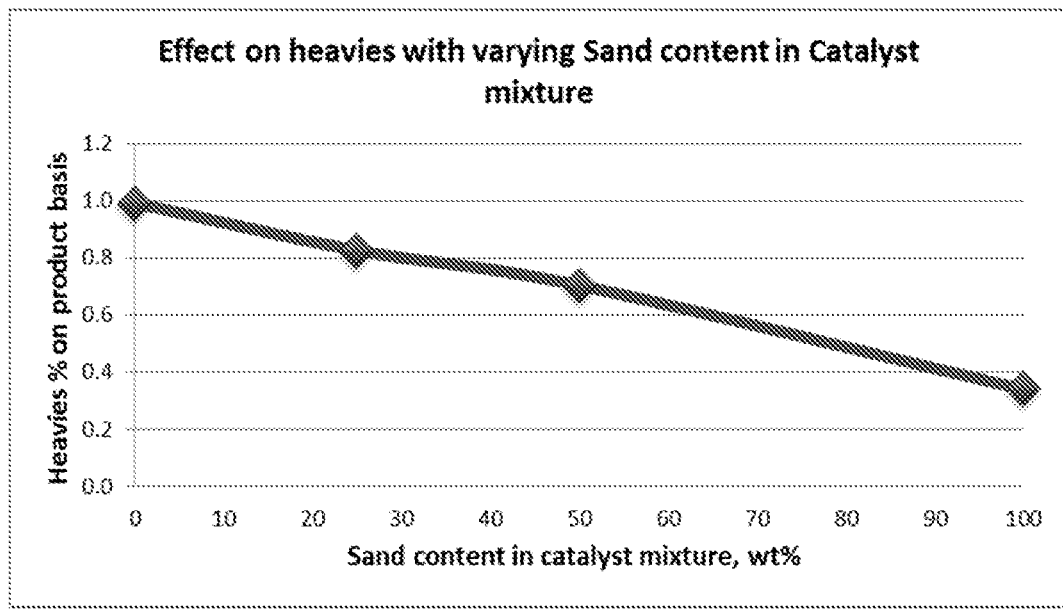
FIG. 8 is a graphical representation of wt. % of heavies (hydrocarbons having a boiling point of 370° C. or more), versus wt. % sand in the catalyst.
Figure 9:
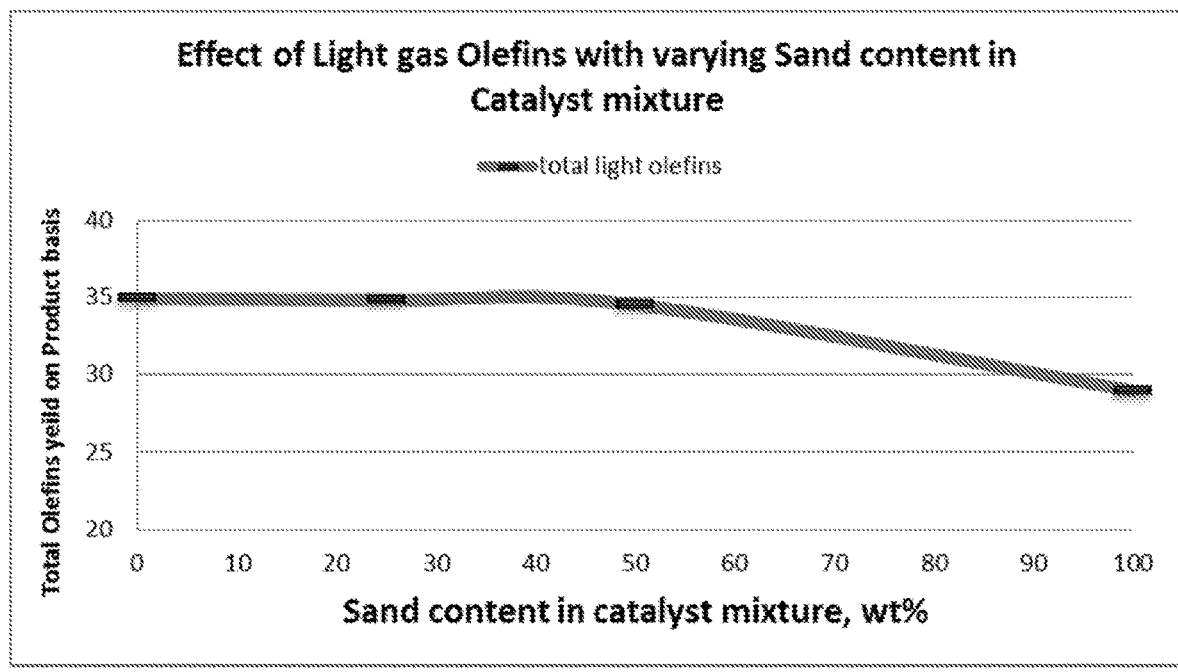
FIG. 9 is a graphical representation of wt. % of total olefins versus wt. % sand in the catalyst mixture.
Figure 10:
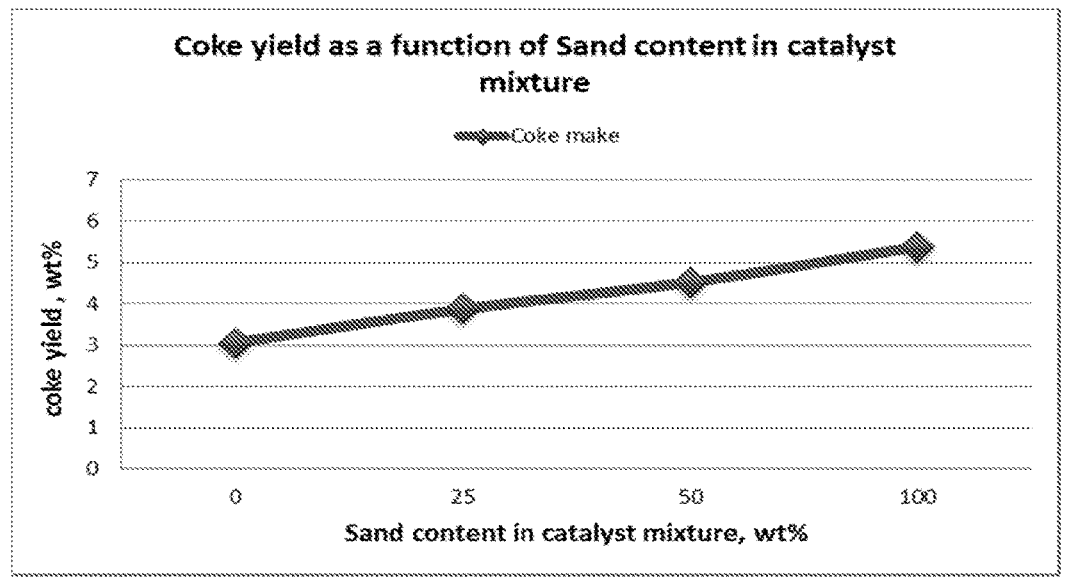
FIG. 10 is a graphical representation of wt. % of coke versus wt. % sand in the catalyst mixture.
Figure 11:
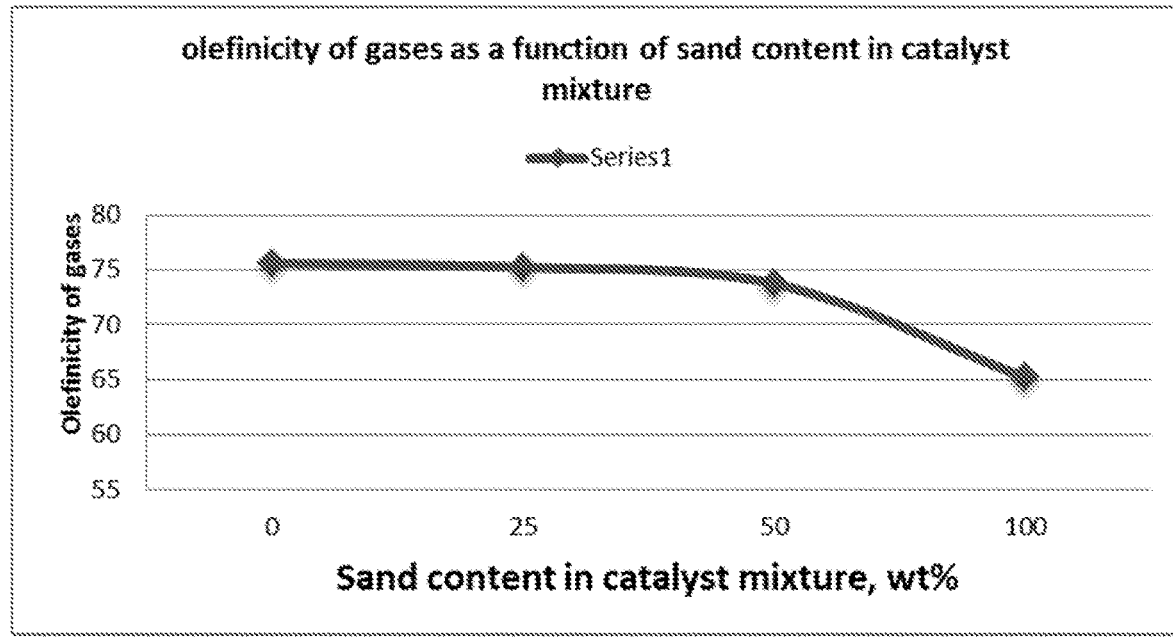
FIG. 11 is a graphical representation of wt. % of olefins in a gaseous stream containing hydrogen gas and $C_4$ or less hydrocarbons versus wt. % sand in the catalyst mixture.
Figure 12:
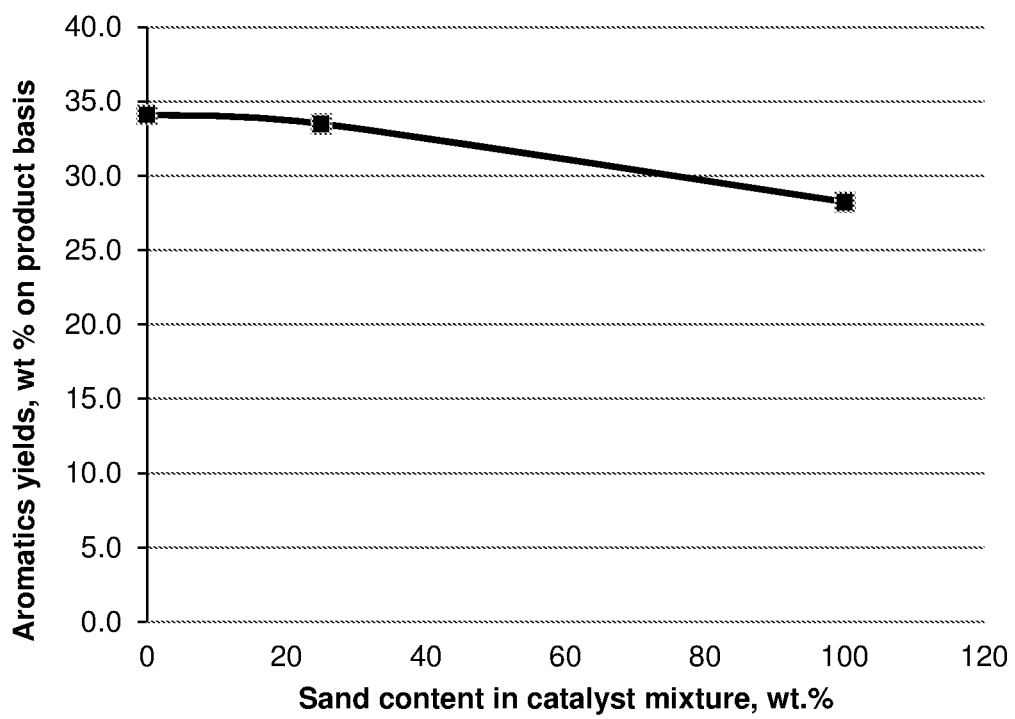
FIG. 12 is a graphical representation of wt. % of aromatics boiling below 240° C. versus wt. % sand in the catalyst mixture.
Figure 13:
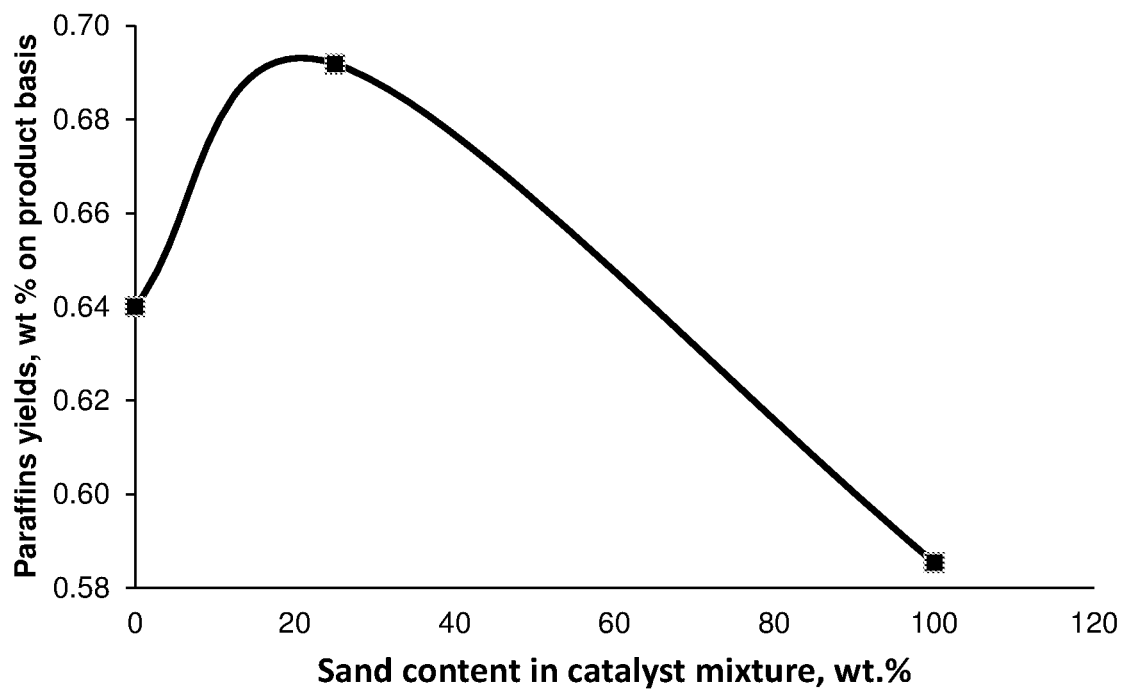
FIG. 13 is a graphical representation of wt. % of paraffins boiling below 240° C. versus wt. % sand in the catalyst mixture.
Figure 14:
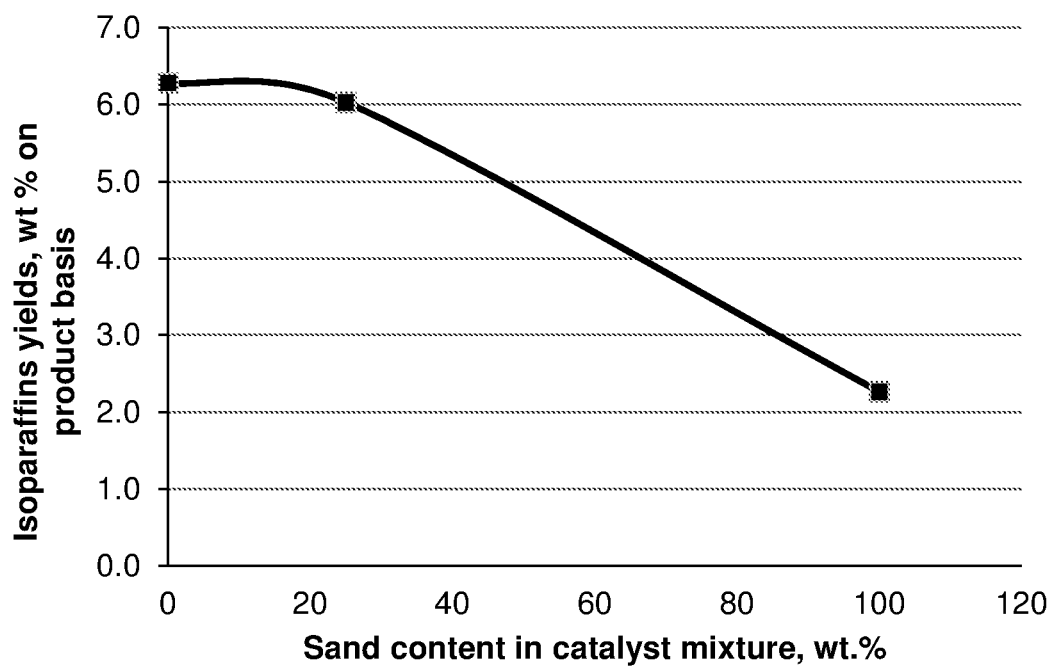
FIG. 14 is a graphical representation of wt. % of iso-paraffins boiling below 240° C. versus wt. % sand in the catalyst mixture.
Figure 15:
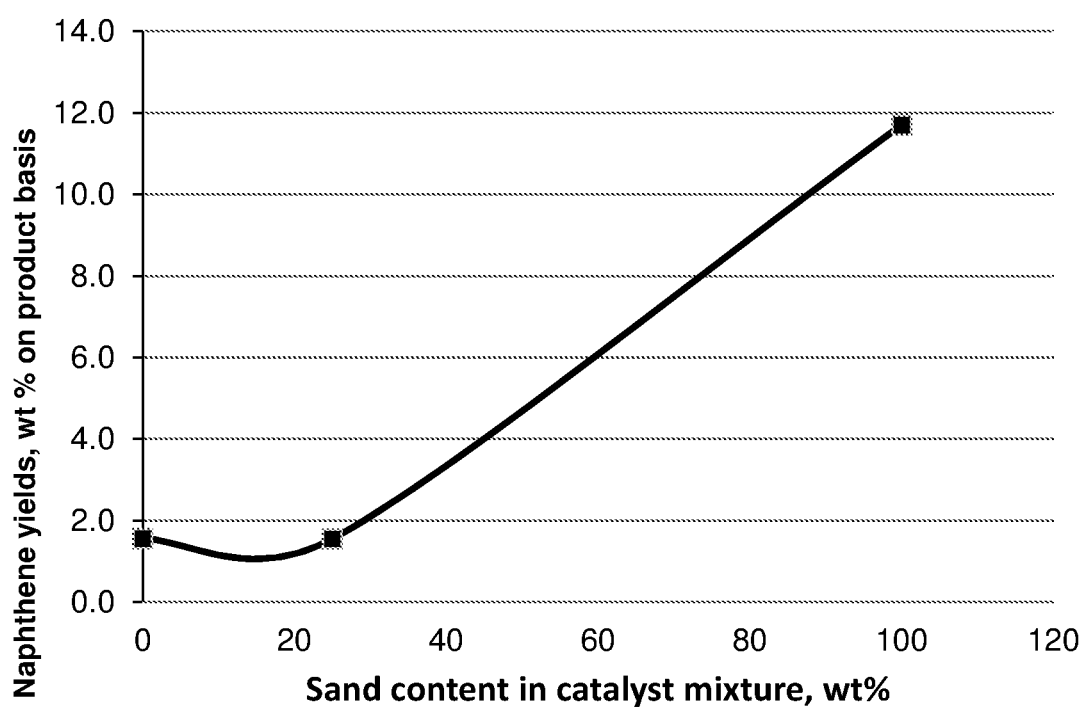
FIG. 15 is a graphical representation of wt. % of napthenes boiling below 240° C. versus wt. % sand in the catalyst mixture.
Figure 16:
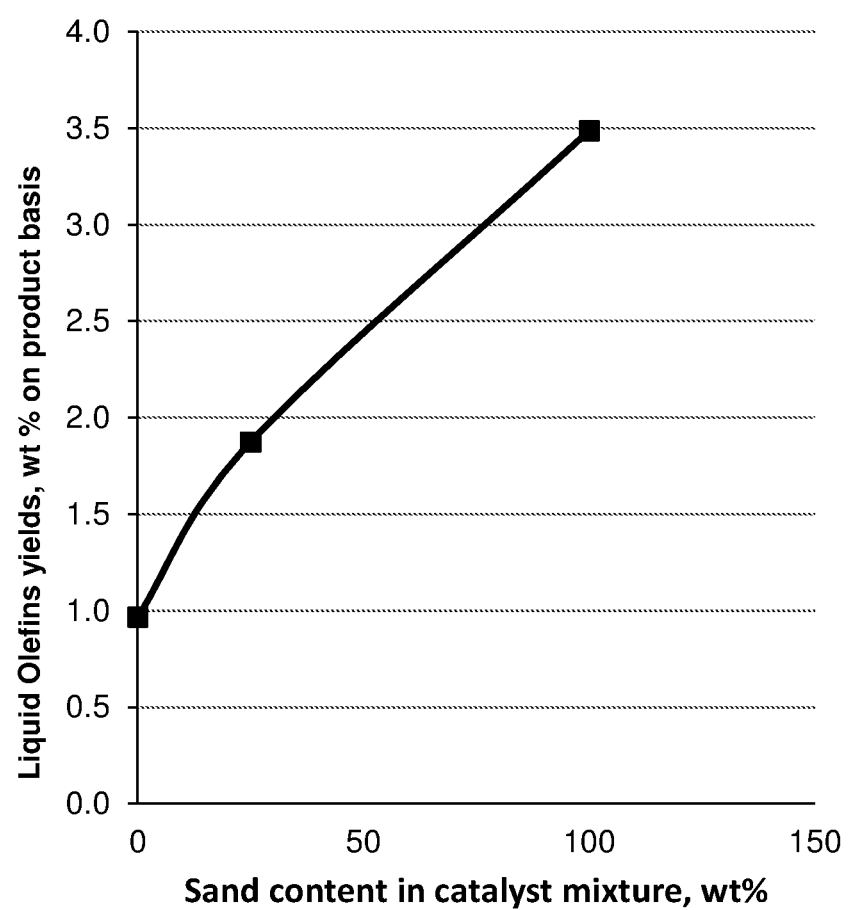
FIG. 16 is a graphical representation of wt. % of liquid olefins boiling below 240° C. versus wt. % sand in the catalyst mixture.
Figure 17:
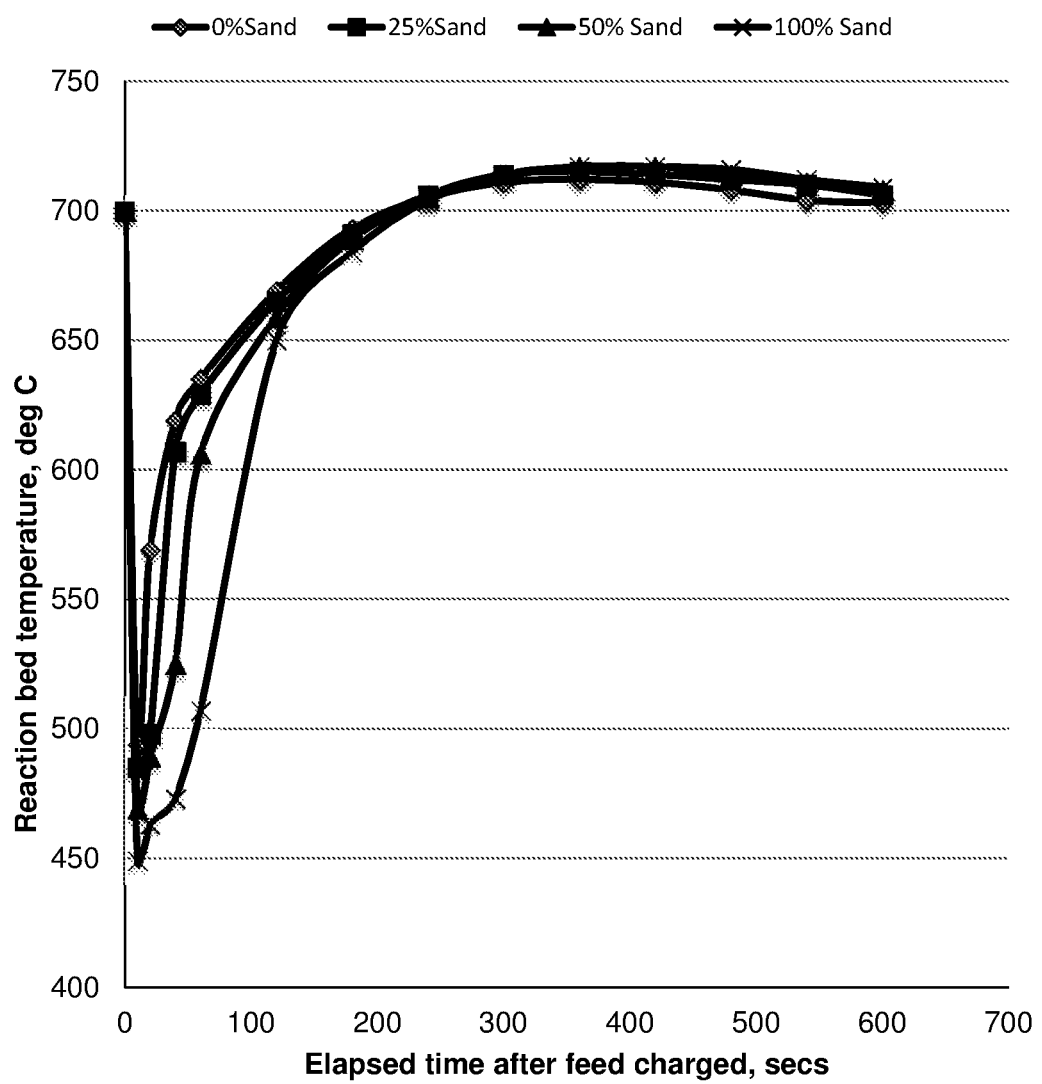
FIG. 17 is a graphical representation of reaction bed temperature in degree Centigrade versus elapsed time after feed charged in seconds.

Table 3A lists the percentages of light gas olefins and yields of aromatics, liquid olefins, iso-paraffins, n-paraffins, and naphthenes boiling below 240° C. for 0 wt. % sand, 25 wt. % sand, and 100 wt. % sand, respectively. FIG. 6 is a graphical representation of the wt. % of methane and ethylene versus wt. % sand in the catalyst. As shown in FIG. 6 and Table 3B, the amount of ethylene and methane increased as the amount of sand was increased in the mixture indicating more thermal cracking with increasing sand content. Table 4 lists the reaction conditions and percentages of $C_2$, $C_3$, and $C_4$ olefins for 0 wt. % sand, 25 wt. % sand, 50 wt. % sand, and 100 wt. % sand, respectively. FIG. 7 is a graphical representation of the wt. % of $C_2$, $C_3$, and $C_4$ olefins versus wt. % sand in the catalyst. As shown in FIG. 7 and Table 4, the percentage yields of light gas olefin decreased when 50 wt. % or more of sand was used. This indicates that the catalytic activity of the catalyst mixture is reduced for making light gas $C_3$ and $C_4$ olefins. Table 5 lists the reaction conditions and percentages of heavies for 0 wt. % sand, 25 wt. % sand, 50 wt. % sand, and 100 wt. % sand, respectively. FIG. 8 is a graphical representation of wt. % of heavies (hydrocarbons having a boiling point of 3700° C. or more), versus wt. % sand in the catalyst. As shown in FIG. 8 and Table 5, the percentage of heavies decreased when 50 wt. % or more of sand was used. Table 6 lists the reaction conditions and percentages of coke for 0 wt. % sand, 25 wt. % sand, 50 wt. % sand, and 100 wt. % sand, respectively. FIG. 9 is a graphical representation of wt. % of total olefins versus wt. % sand in the catalyst mixture. As shown in FIG. 9 and Table 6 the total light gas olefins yield decreased when 50 wt. % or more of sand was used. Table 5 lists the reaction conditions and percentages of total gas olefins for 0 wt. % sand, 25 wt. % sand, 50 wt. % sand, and 100 wt. % sand, respectively. FIG. 10 is a graphical representation of wt. % of coke versus wt. % sand in the catalyst mixture. As shown in FIG. 10 and Table 6, the percentage of coke yield increased when 50 wt. % or more of sand was used. Table 7 lists the feed composition, catalyst composition, and reactor bed temperatures of total olefins in the gaseous hydrocarbon stream for 0 wt. % sand, 25 wt. % sand, 50 wt. % sand, and 100 wt. % sand, respectively. FIG. 11 is a graphical representation of wt. % of olefins in a gas stream containing hydrogen gas and $C_4$ or less hydrocarbons versus wt. % sand in the catalyst mixture. As shown in FIG. 11 and Table 7, the amount of olefins in the gaseous stream decreases when 50 wt. % or more of sand is used. FIGS. 12-16 are other graphical representations of products (e.g., aromatics, olefins, paraffins, iso-paraffins, naphthenes, etc.) obtained from using sand in combination with a mixture of catalysts. FIG. 12 is a graphical representation of wt. % of aromatics versus wt. % sand in the catalyst mixture. As shown in FIG. 12, a slight decrease in aromatics yield was observed when 50 wt. % or more of sand was use. FIG. 13 is a graphical representation of wt. % of paraffins versus wt. % sand in the catalyst mixture. FIG. 14 is a graphical representation of wt. % of iso-paraffins versus wt. % sand in the catalyst mixture. As shown in FIGS. 13-14, a substantial decrease in the paraffins and iso-paraffins yield was observed when 25 wt. % or more of sand was use. FIG. 15 is a graphical representation of wt. % of napthenes versus wt. % sand in the catalyst mixture. As shown in FIG. 15, an increase in the naphthenes yield was observed when 20 wt. % or more of sand was used. FIG. 16 is a graphical representation of wt. % of liquid olefins versus wt. % sand in the catalyst mixture. As shown in FIG. 16, an increase in the liquid olefins yield was observed as the amount of sand was increased. As shown, in FIGS. 12-16, the amounts and/or types of compounds produced can be varied based on the amount of sand used in combination with the catalysts. Table 8 lists the reaction conditions and catalysts for 0 wt. % sand, 25 wt. % sand, 50 wt. % sand, and 100 wt. % sand, respectively. FIG. 17 is a graphical representation of the reaction bed temperature versus elapsed time after the feed was charged.

These data show that the direct hydropyrolysis of a hydrogen rich carbon containing feed in the absence of a hydrogen donor feed results in a product that has more than 50 wt. % of olefins and aromatics. Further, mixing of sand in the catalyst in amounts of up to 25 wt. % results in (1) no loss of catalytic activity (i.e., olefin and aromatic yields are maintained), (2) a reduction in methane yield as compared to the use of sand alone, (3) increases the production of ethylene over propylene, and (d) reduces liquid isoparaffins and heavies.

TABLE 3A

| Catalyst (wt. % sand) | $C_2$-$C_4$ Olefins wt. % | Aromatics wt. % | Liquid Olefins wt. % | Iso-paraffins wt. % | n-paraffins wt. % | Naphthenes wt. % |
|---|---|---|---|---|---|---|
| 0 | 34.9 | 34.1 | 1.0 | 6.3 | 0.6 | 1.6 |
| 25 | 34.8 | 33.5 | 1.9 | 6.0 | 0.7 | 1.5 |
| 100 | 29.0 | 28.2 | 3.5 | 2.3 | 0.6 | 11.7 |

TABLE 3B

| | Catalyst Composition | | | |
|---|---|---|---|---|
| | 0% sand | 25% sand | 50% sand | 100% sand |
| C/F ratio g/g | 6.0 | 6.0 | 6.0 | 6.0 |
| Reaction temperature at start ° C. | 700 | 700 | 700 | 700 |
| 1 Min. average reaction bed temperature ° C. | 603.4 | 583.8 | 557.8 | 518.4 |
| Dry catalyst fed g | 8.9 | 9.0 | 9.0 | 9.0 |
| Feed weight transferred g | 1.5 | 1.5 | 1.5 | 1.5 |
| Methane yield, wt. % | 1.5 | 2.0 | 3.4 | 6.4 |
| Ethylene Yield, wt. % | 6.8 | 7.1 | 7.5 | 10.3 |

TABLE 4

| | Catalyst Composition, wt. % | | | |
|---|---|---|---|---|
| | 0% sand | 25% sand | 50% sand | 100% sand |
| C/F ratio g/g | 6.0 | 6.0 | 6.0 | 6.0 |
| Reaction temperature at start ° C. | 700 | 700 | 700 | 700 |
| 1 Min average reaction bed temperature ° C. | 603.4 | 583.8 | 557.8 | 518.4 |
| Dry catalyst fed g | 8.9 | 9.0 | 9.0 | 9.0 |
| Feed weight transferred g | 1.5 | 1.5 | 1.5 | 1.5 |
| C4 olefin, wt. % | 12.3 | 12.0 | 11.6 | 7.8 |
| C3 olefin, wt. % | 15.8 | 15.8 | 15.4 | 10.9 |
| C2 olefin, wt. % | 6.8 | 7.1 | 7.5 | 10.3 |

TABLE 5

| | Catalyst Composition, wt. % | | | |
|---|---|---|---|---|
| | 0% sand | 25% sand | 50% sand | 100% sand |
| C/F ratio g/g | 6.0 | 6.0 | 6.0 | 6.0 |
| Reaction temperature at start ° C. | 700 | 700 | 700 | 700 |
| 1 Min. average reaction bed temperature ° C. | 603.4 | 583.8 | 557.8 | 518.4 |
| Dry catalyst fed g | 8.9 | 9.0 | 9.0 | 9.0 |
| Feed weight transferred g | 1.5 | 1.5 | 1.5 | 1.5 |
| Heavies >370° C. | 1.0 | 0.8 | 0.7 | 0.3 |

TABLE 6

| | Catalyst Composition, wt. % | | | |
|---|---|---|---|---|
| | 0% sand | 25% sand | 50% sand | 100% sand |
| C/F ratio g/g | 6.0 | 6.0 | 6.0 | 6.0 |
| Reaction temperature at start ° C. | 700 | 700 | 700 | 700 |
| 1 min average reaction bed temperature ° C. | 603.4 | 583.8 | 557.8 | 518.4 |
| Dry catalyst fed g | 8.9 | 9.0 | 9.0 | 9.0 |
| Feed weight transferred g | 1.5 | 1.5 | 1.5 | 1.5 |
| Coke, wt. % | 3.1 | 3.9 | 4.5 | 5.4 |

TABLE 7

| | Catalyst Composition | | | |
|---|---|---|---|---|
| | 0% sand | 25% sand | 50% sand | 100% sand |
| C/F ratio g/g | 6.0 | 6.0 | 6.0 | 6.0 |
| Reaction temperature at start ° C. | 700 | 700 | 700 | 700 |
| 1 min average reaction bed temperature ° C. | 603.4 | 583.8 | 557.8 | 518.4 |
| Dry catalyst fed g | 8.9 | 9.0 | 9.0 | 9.0 |
| Feed weight transferred g | 1.5 | 1.5 | 1.5 | 1.5 |
| % olefins/Total gases | 75.6 | 75.3 | 73.8 | 65.2 |

TABLE 8

| Feed name | 0 | 25 | 50 | 100 |
|---|---|---|---|---|
| Feed type | Solid Powder | Solid Powder | Solid Powder | Solid Powder |
| Feed Composition | Mixed Plastic | Mixed Plastic | Mixed Plastic | Mixed Plastic |
| Catalyst Composition, wt. % | 0% sand | 25% sand | 50% sand | 100% sand |
| 0 min bed temperature, ° C. | 700 | 700 | 700 | 700 |
| 10 sec bed temperature, ° C. | 494 | 485 | 469 | 449 |
| 20 sec bed temperature, ° C. | 569 | 498 | 489 | 463 |
| 40 sec bed temperature, ° C. | 619 | 607 | 525 | 473 |
| 1 min bed temperature, ° C. | 635 | 629 | 606 | 507 |
| 2 min bed temperature, ° C. | 669 | 665 | 659 | 650 |
| 3 min bed temperature, ° C. | 693 | 691 | 689 | 684 |
| 4 min bed temperature, ° C. | 705 | 706 | 705 | 704 |
| 5 min bed temperature, ° C. | 711 | 714 | 714 | 713 |
| 6 min bed temperature, ° C. | 712 | 715 | 717 | 717 |
| 7 min bed temperature, ° C. | 711 | 714 | 717 | 717 |
| 8 min bed temperature, ° C. | 708 | 712 | 714 | 716 |
| 9 min bed temperature, ° C. | 704 | 710 | 711 | 712 |
| 10 min bed temperature, ° C. | 703 | 706 | 708 | 709 |
| 10 min Average, ° C. | 666.6 | 660.9 | 651.6 | 636.7 |
| 1 min Average, ° C. | 603.4 | 583.8 | 557.8 | 518.4 |

Example 3

Conversion of Hydrogen Rich Carbon Containing Feeds in the Presence of Carrier Gas Having Hydrogen to Inhibit Coking of Catalyst at High Temperatures Treatment of a hydrogen rich carbon containing stream was performed using Catalyst A in the presence and absence of hydrogen gas at various temperatures to determine the effect of a small amount of hydrogen to inhibit coking and maintain the activity of the catalyst. Mixed plastic (1.5 g) having the composition listed in Table 2 was mixed with Catalyst A (9 g, 62.5 wt. % spent FCC catalyst and 37.5 wt. % ZSM-5 zeolite catalyst). The combined mixture was then fed to the fluidized bed reactor described in Example 1. The plastic feed was in the form of a 200 micron plastic powder. A 10 mole or volume percent of $H_2$ in $N_2$ mixture was employed as the carrier gas at a flow rate of 175 NCC/min. Studies were conducted by maintaining the reactor bed temperature, before feed and catalyst mixture was introduced, at 600° C., 635° C. and 670° C. respectively (i.e. at 3 different starting temperatures). Studies were also conducted at the same conditions as before with 100% $N_2$ as carrier gas. For each of the temperature condition studied, a new set of catalyst and feed mixture was prepared and used. Tables 9-14 summarize the experimental findings. Table 9 lists the reaction conditions and yields of products for each experiment. Table 10 lists the $C_1$-$C_4$ yield, % liquid yield and % coke yield for each experiment. Table 11 lists the total aromatics yield boiling below 240° C. in weight percent, the weight percentage yield of $C_6$-$C_8$ aromatics, the weight ratio of total aromatics yield to coke yield, the weight ratio of $C_6$-$C_8$ aromatics yield to coke yield, the weight ratio of light gas olefins yield to coke yield for each experiment. Table 12 lists the weight percentage yields of: $C_4$ olefins, $C_3$ olefin, $C_2$ olefins, and total light gas olefins for each experiment. Table 13 lists the hydrogen transfer index (HTI), isomerization coefficient (defined as ratio of weigh percentage yield n-butane to yield of butene isomers), ratios of weight % yields of $C_2$ olefin to $C_2$ saturate, $C_3$ olefin to $C_3$ saturate, and $C_4$ olefin to $C_4$ saturate, and weight percentage of i-$C_4$ in total $C_4$ compounds, weight percentage concentration of olefins in total gases, and a ratio of wt. % light gas olefins to wt. % saturates yield for each experiment. Table 14 lists the detailed hydrocarbon analysis (DHA) of the liquid products and the balance of unknowns and heavies of the liquid products boiling below 240° C.

From analysis of the data in Tables 10 and 11, a decrease in coke make at temperatures at 525° C. or above was observed when a small amount of hydrogen was present in the carrier gas. Thus, catalyst activity was improved at these temperatures when a small amount of hydrogen gas was introduced into the carrier gas to inhibit coke make on the catalyst. Also, the production of light gas olefins and aromatics increased slightly in presence of hydrogen gas. Since the ratios of light gas olefins yield per unit coke-make and the aromatics yield per unit coke-make were higher in the case when the carrier gas contained a small amount of hydrogen, it can be predicted that coke make can be reduced with a small amount of hydrogen gas present. Thus, the yields of light gas olefins and aromatics are predicted to be slightly higher in a circulating bed fluid catalytic cracking type unit operating on a constant regenerator air supply containing a small amount of hydrogen. By way of example, referring to the last two columns in Table 11, the ratios for light gas olefins to coke were 6.4 and 5.8 respectively. If a catalyst regenerator can handle about 5 wt % coke only, then that means for the case when the carrier gas contains a small amount of hydrogen, the light gas olefins yield at 5 wt % coke yield would be 32 wt % as compared to 29% yield of light gas olefins when the carrier gas did not contain any hydrogen. This means an increase in yield of light gas olefins by 3 wt %. Similar analysis on aromatics yield per unit coke would reveal an increase in aromatics yield in a circulating fluidized bed when the carrier gas contains small amount of hydrogen. Since production of light gas olefins and $C_6$-$C_8$ aromatics per unit amount of coke deposited and the total amount of aromatics was observed in the presence (Example 3) and absence of hydrogen gas (Example 2), it is believed that light gas olefins, total aromatics, in particular, $C_6$-$C_8$ aromatics can be produced when a hydrogen rich carbon stream is contacted with the catalyst of the present invention in a fluidized catalytic cracking unit.

TABLE 9

| Reaction Type | 10:90 $H_2$:$N_2$ | 100% $N_2$ | 10:90 $H_2$:$N_2$ | 100% $N_2$ | 10:90 $H_2$:$N_2$ | 100% $N_2$ |
|---|---|---|---|---|---|---|
| Feed name | Mixed Plastic | Mixed Plastic | Mixed Plastic | Mixed Plastic | Mixed Plastic | Mixed Plastic |
| Catalyst name | A | A | A | A | A | A |
| Feed weight transferred, gm | 1.50 | 1.50 | 1.50 | 1.50 | 1.50 | 1.50 |
| Bone Dry catalyst fed, gm | 9.05 | 8.95 | 9.05 | 9.05 | 9.01 | 8.95 |
| C/F ratio, gm/gm | 6.03 | 6.0 | 6.03 | 6.03 | 6.00 | 6.0 |
| Reaction temperature at start, ° C. | 600 | 600 | 635 | 635 | 670 | 670 |
| 1 min average reactor bed temperature, ° C. | 482 | 472 | 525 | 525 | 567 | 570 |
| Yields, wt. % on $H_2$-free product basis | | | | | | |
| Methane, wt. % | 0.92 | 0.40 | 1.00 | 0.56 | 3.20 | 0.99 |
| Ethane, wt. % | 0.87 | 0.43 | 0.73 | 0.52 | 0.69 | 0.74 |
| Ethylene, wt. % | 6.17 | 3.68 | 6.50 | 5.07 | 6.36 | 5.78 |
| Carbon dioxide, wt. % | 1.29 | 1.63 | 1.54 | 1.93 | 1.85 | 1.91 |
| Propane, wt. % | 3.90 | 4.26 | 3.15 | 3.58 | 3.11 | 3.49 |
| Propylene, wt. % | 12.76 | 11.05 | 13.63 | 12.93 | 14.67 | 14.75 |
| iso-Butane, wt. % | 4.56 | 4.99 | 3.85 | 4.75 | 3.77 | 3.53 |
| n-Butane, wt.% | 2.67 | 1.84 | 2.07 | 1.57 | 1.31 | 1.41 |
| trans-2-Butene, wt. % | 3.16 | 2.67 | 3.10 | 2.89 | 2.99 | 3.01 |
| 1-Butene, wt. % | 1.75 | 1.63 | 1.79 | 1.79 | 1.90 | 2.01 |
| iso-Butylene, wt. % | 4.68 | 4.55 | 4.56 | 4.76 | 4.72 | 4.97 |
| cis-2-butene, wt. % | 2.22 | 1.92 | 2.19 | 2.09 | 2.16 | 2.21 |
| Carbon monoxide, wt. % | 0.25 | 0.10 | 0.35 | 0.00 | 0.80 | 0.25 |
| Gasoline, wt. % | 43.83 | 45.34 | 41.66 | 42.42 | 42.11 | 43.30 |
| Diesel, wt. % | 5.75 | 9.14 | 7.55 | 8.37 | 4.73 | 5.16 |
| Heavies, wt. % | 0.56 | 1.64 | 0.78 | 0.88 | 0.49 | 0.86 |
| Coke, wt. % | 4.67 | 4.73 | 5.55 | 5.88 | 5.12 | 5.64 |

TABLE 10

| Reaction Type | 10:90 $H_2$:$N_2$ | 100% $N_2$ | 10:90 $H_2$:$N_2$ | 100% $N_2$ | 10:90 $H_2$:$N_2$ | 100% $N_2$ |
|---|---|---|---|---|---|---|
| $C_1$-$C_4$ yield, wt. % | 45.2 | 39.1 | 44.5 | 42.5 | 47.5 | 45.0 |
| % Liquid yield, wt. % | 50.1 | 56.1 | 50.0 | 51.7 | 47.3 | 49.3 |
| % Coke yield, wt. % | 4.7 | 4.7 | 5.6 | 5.9 | 5.1 | 5.6 |

TABLE 11

| Reaction Type | 10:90 $H_2$:$N_2$ | 100% $N_2$ | 10:90 $H_2$:$N_2$ | 100% $N_2$ | 10:90 $H_2$:$N_2$ | 100% $N_2$ |
|---|---|---|---|---|---|---|
| Total aromatics yield boiling below 240° C., wt. % | 32.42 | 31.39 | 32.81 | 31.83 | 35.09 | 32.35 |
| $C_6$-$C_8$ aromatic, wt. % | 23.81 | 23.20 | 24.44 | 22.63 | 26.33 | 22.87 |
| Total Aromatics/Coke, Wt. ratio | 6.9 | 6.6 | 5.9 | 5.4 | 6.9 | 5.7 |
| ($C_6$-$C_8$ aromatics)/Coke, Wt. ratio | 5.1 | 4.9 | 4.4 | 3.9 | 5.1 | 4.1 |
| Light gas olefins/Coke, Wt. ratio | 6.6 | 5.4 | 5.7 | 5.0 | 6.4 | 5.8 |

TABLE 12

| Reaction Type | 10:90 H$_2$:N$_2$ | 100% N$_2$ | 10:90 H$_2$:N$_2$ | 100% N$_2$ | 10:90 H$_2$:N$_2$ | 100% N$_2$ |
|---|---|---|---|---|---|---|
| C$_4$ olefins, wt. % | 11.81 | 10.76 | 11.64 | 11.54 | 11.77 | 12.20 |
| C$_3$ olefin, wt. % | 12.76 | 11.05 | 13.63 | 12.93 | 14.67 | 14.75 |
| C$_2$ olefin, wt. % | 6.17 | 3.68 | 6.50 | 5.07 | 6.36 | 5.78 |
| Total olefins, wt. % | 30.74 | 25.49 | 31.77 | 29.54 | 32.80 | 32.72 |

TABLE 13

| Reaction Type | 10:90 H$_2$:N$_2$ | 100% N$_2$ | 10:90 H$_2$:N$_2$ | 100% N$_2$ | 10:90 H$_2$:N$_2$ | 100% N$_2$ |
|---|---|---|---|---|---|---|
| Hydrogen Transfer Index (HTI) | 0.87 | 1.00 | 0.67 | 0.77 | 0.56 | 0.57 |
| Isomerization coefficient | 0.174 | 0.178 | 0.182 | 0.184 | 0.192 | 0.197 |
| C$_2$ olefin/C$_2$ saturate | 7.1 | 8.6 | 8.9 | 9.8 | 9.2 | 7.9 |
| C$_3$ olefin/C$_3$ saturate | 3.3 | 2.6 | 4.3 | 3.6 | 4.7 | 4.2 |
| C$_4$ olefins/C$_4$ saturates | 1.6 | 1.6 | 2.0 | 1.8 | 2.3 | 2.5 |
| % of i-C$_4$ in Total C$_4$ | 23.9 | 28.4 | 21.9 | 26.6 | 22.4 | 20.6 |
| % of olefins in Total gases | 68.0 | 65.1 | 71.5 | 69.6 | 69.0 | 72.6 |
| % of olefins/% saturates | 2.6 | 2.2 | 3.2 | 2.8 | 3.7 | 3.6 |

TABLE 14

DHA Of Liquid Products Boiling Below 240° C.

| Reaction Type | 10:90 H$_2$:N$_2$ | 100% N$_2$ | 10:90 H$_2$:N$_2$ | 100% N$_2$ | 10:90 H$_2$:N$_2$ | 100% N$_2$ |
|---|---|---|---|---|---|---|
| Paraffins, wt. % | 1.184 | 1.435 | 1.207 | 1.170 | 1.108 | 1.420 |
| Isoparaffins, wt. % | 10.161 | 12.389 | 9.598 | 12.120 | 8.545 | 13.330 |
| Olefins, wt. % | 2.944 | 9.159 | 2.555 | 4.858 | 0.976 | 3.900 |
| Naphthenes, wt. % | 3.727 | 5.390 | 3.135 | 3.867 | 2.329 | 4.030 |
| Aromatics, wt. % | 73.968 | 69.233 | 78.758 | 75.037 | 83.315 | 74.720 |
| | Balance Unknowns And Heavies | | | | | |
| BTX + EX content in liquid boiling below 240° C., wt. %* | 54.32 | 51.17 | 58.67 | 53.35 | 62.52 | 52.81 |

*BTX-benzene, toluene, and xylenes; EB-ethyl benzene

The invention claimed is:

1. A method for producing olefins and aromatic compounds from a hydrogen lean carbon containing feed, the method comprising:
   hydropyrolyzing the hydrogen lean carbon containing feed comprising carbonaceous compounds in the presence of a catalyst comprising a mixture of a spent FCC catalyst and a ZSM-5 catalyst and a hydrogen donor feed at a temperature of 400° C. to 700° C. in a first stage of a reactor to produce a product comprising:
   (i) olefins and aromatic compounds; or
   (ii) a hydrocarbonaceous stream, wherein the hydrocarbonaceous stream is further processed into olefins and aromatic compounds,
   wherein the olefins and aromatic compounds from (i) or the hydrocarbonaceous stream from (ii) are each obtained by hydrogenation of the hydrogen lean carbon containing feed with the hydrogen donor feed to produce a hydrogenated feed and cracking of carbonaceous compounds comprised in the hydrogenated feed, the cracking of carbonaceous compounds comprised in the hydrogenated feed results in un-cracked or cracked hydrogenated feed,
   wherein the hydrogen donor feed comprises at least one compound that donates hydrogen to the carbonaceous compounds in the hydrogen lean carbon containing feed, said at least one compound being a compound other than H$_2$,
   wherein the hydrogen lean carbon containing feed is selected from the group consisting of plant material and aquatic material, or a mixture thereof and the compound in the hydrogen donor feed that donates hydrogen to the carbonaceous compounds in the hydrogen lean carbon containing feed is a polymer,
   wherein the hydropyrolyzing is conducted at a pressure of about 17.5 MPa, and
   wherein a catalyst to feed ratio, defined as a mass ratio between the catalyst and a mixture of the hydrogen lean carbon containing feed and the hydrogen donor feed, ranges from 6.01 to 9.02 g/g.

2. The method of claim 1, wherein the method further comprises reforming carbon compounds from the un-cracked or cracked hydrogenated feed to aromatic compounds.

3. The method of claim 1, wherein the hydrogen lean carbon containing feed consists of aquatic material.

4. The method of claim 1, wherein the polymer is selected from the group consisting of a polyolefin, polyethylene terephthalate (PET), polyvinyl chloride (PVC), polyamide, polycarbonate, polyurethane, and polyester, or any combination thereof.

5. The method of claim 1, wherein the spent FCC catalyst is selected from the group consisting of X zeolites, Y zeolites or USY zeolites, mordenite zeolites, faujasite zeolites, nanocrystalline zeolites, MCM framework mesoporous materials, SBA-15 mesoporous silica, silico-alumino phosphate, gallophosphate, titanophosphate, or any combination thereof as is, or present in an active or inactive state.

6. The method of claim 5, wherein a combination of the hydrogen lean carbon containing feed and the hydrogen donor feed comprises greater than 12 wt. % of hydrogen.

7. The method of claim 1, wherein the reactor further comprises a second stage, and wherein one or more of the following reactions occur(s) in the first stage of the reactor or in the second stage of the reactor:
   (a) removal of side chains present in mono-aromatic compounds present in the un-cracked or cracked hydrogenated feed;

(b) aromatization of paraffins, olefins, or naphthenes present in the un-cracked or cracked hydrogenated feed;
(c) hydrogenation of coke or minimization of coke formation;
(d) isomerization of compounds present in the un-cracked or cracked hydrogenated feed; or
(e) hydrodeoxygenation of compounds present in the un-cracked or cracked hydrogenated feed to aromatic compounds.

8. The method of claim 1, wherein a weight ratio of the spent fluid catalytic cracking (FCC) catalyst to the ZSM-5 catalyst is 3:1.

9. The method of claim 1, wherein the aquatic material has a hydrogen content of 3, 2, 1, or less than 1 wt. %.

10. The method of claim 2, wherein the aquatic material has a hydrogen content of 3, 2, 1, or less than 1 wt. %.

* * * * *